US010397963B2

(12) United States Patent
Ito et al.

(10) Patent No.: US 10,397,963 B2
(45) Date of Patent: Aug. 27, 2019

(54) INFORMATION PROCESSING APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventors: Koji Ito, Inagi (JP); Mitsuru Konji, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 120 days.

(21) Appl. No.: 15/462,100

(22) Filed: Mar. 17, 2017

(65) Prior Publication Data

US 2017/0290071 A1    Oct. 5, 2017

(30) Foreign Application Priority Data

Mar. 31, 2016 (JP) ................. 2016-073180

(51) Int. Cl.
*H04W 76/10* (2018.01)
*H04W 76/14* (2018.01)
(Continued)

(52) U.S. Cl.
CPC ............ *H04W 76/10* (2018.02); *H04L 69/18* (2013.01); *H04W 4/80* (2018.02); *H04W 48/18* (2013.01);
(Continued)

(58) Field of Classification Search
CPC ..... H04W 76/10; H04W 76/19; H04W 76/14; H04W 4/80; H04W 48/18; H04W 88/06; H04L 69/18
(Continued)

(56) References Cited

U.S. PATENT DOCUMENTS 9,020,328 B2    4/2015 Yamaji
9,311,961 B2    4/2016 Yamaji
(Continued)

FOREIGN PATENT DOCUMENTS

EP    2750474 A1    7/2014
EP    2753123 A1    7/2014
(Continued)

OTHER PUBLICATIONS

Aug. 9, 2017 European Search Report in European Patent Appln. No. 17000432.9.

*Primary Examiner* — Obaidul Huq
(74) *Attorney, Agent, or Firm* — Venable LLP

(57) ABSTRACT

In an information processing apparatus instructions are executed to perform communication with a communication apparatus by a first communication method and a second communication method, obtain, from the communication apparatus, first information relating to a network connection in the communication apparatus using the first communication method, and hold the obtained first information in a memory. When the information processing apparatus cannot communicate by the first communication method using the first information, second information is obtained from the communication apparatus and via communication using the second communication method, relating to the network connection in the communication apparatus using the first communication method, and when the obtained second information is different from the first information, the first information is transmitted to the communication apparatus and via communication using the second communication method.

17 Claims, 19 Drawing Sheets

(51) Int. Cl.
    *H04W 4/80*     (2018.01)
    *H04W 48/18*     (2009.01)
    *H04W 88/06*     (2009.01)
    *H04L 29/06*     (2006.01)
    *H04W 76/19*     (2018.01)

(52) U.S. Cl.
    CPC ........... *H04W 76/14* (2018.02); *H04W 76/19*
                  (2018.02); *H04W 88/06* (2013.01)

(58) Field of Classification Search
    USPC ................................................ 370/310, 328
    See application file for complete search history.

(56) References Cited

U.S. PATENT DOCUMENTS

| | | |
|---|---|---|
| 2012/0020648 A1 | 1/2012 | Yamaji |
| 2014/0043979 A1* | 2/2014 | Etemad .................. H04W 4/70 |
| | | 370/237 |
| 2015/0213837 A1 | 7/2015 | Yamaji |
| 2015/0245399 A1* | 8/2015 | Aoki ..................... H04W 76/14 |
| | | 370/329 |
| 2016/0234876 A1* | 8/2016 | Burra ................ H04W 28/0284 |
| 2016/0255589 A1* | 9/2016 | Sato ........................ H04W 4/80 |
| | | 370/311 |

FOREIGN PATENT DOCUMENTS

| | | |
|---|---|---|
| EP | 2838278 A1 | 2/2015 |
| JP | 2012-044646 A | 3/2012 |
| JP | 5686673 B2 | 3/2015 |

\* cited by examiner

| AD Structure | | octet | value | description |
|---|---|---|---|---|
| AD Structure1 | Length | 1 | 0x02 | |
| | AD type | 1 | 0x01 | flags |
| | Data | 1 | 0x06 | LE General Discoverable Mode & BR/EDR Not Supported |
| AD Structure2 | Length | 1 | 0x07 | |
| | AD type | 1 | 0xFF | INDICATIVE THAT Data IS COMMUNICATION APPARATUS SPECIFIC DATA |
| | Data | 4 | 0xAABBCCDD | COMMUNICATION APPARATUS SPECIFIC INFORMATION |
| | | 2 | ARBITRARY | FUNCTION AND STATE OF COMMUNICATION APPARATUS |
| AD Structure3 | Length | 1 | 0x09 | |
| | AD type | 1 | 0x09 | INDICATIVE THAT Data IS NAME OF COMMUNICATION APPARATUS |
| | Data | 8 | PrinterA | NAME OF COMMUNICATION APPARATUS |

1912

| octet | value | description |
|---|---|---|
| 1 | 1 | PRESENCE/ABSENCE OF PRINT FUNCTION |
| 2 | 0 | COMMUNICATION APPARATUS IS IN ERROR STATE |
| 3 | 0 | ... |
| ... | ... | ... |
| 15 | 0 | ... |
| 16 | 0 | PAGE NUMBER |

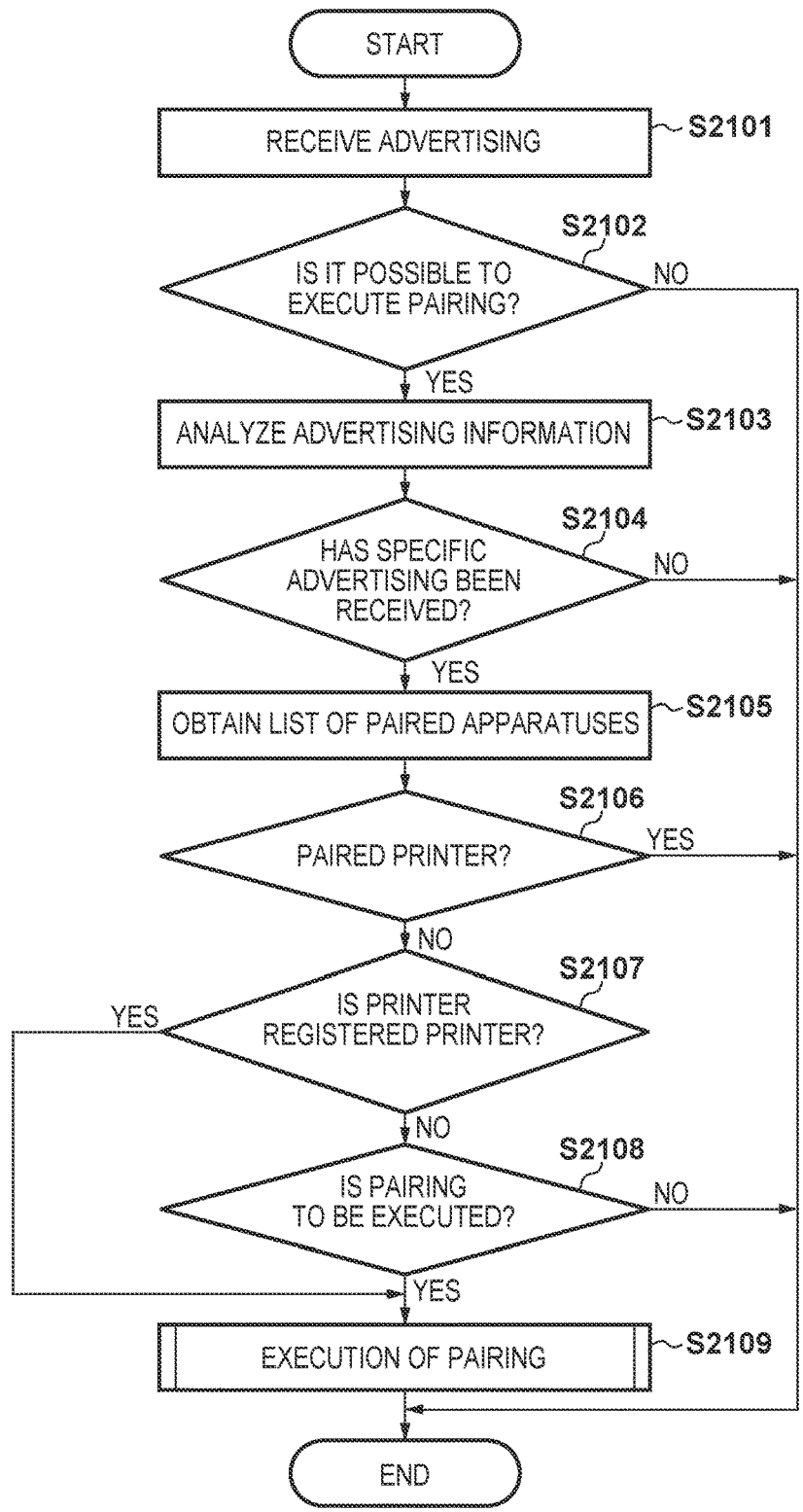

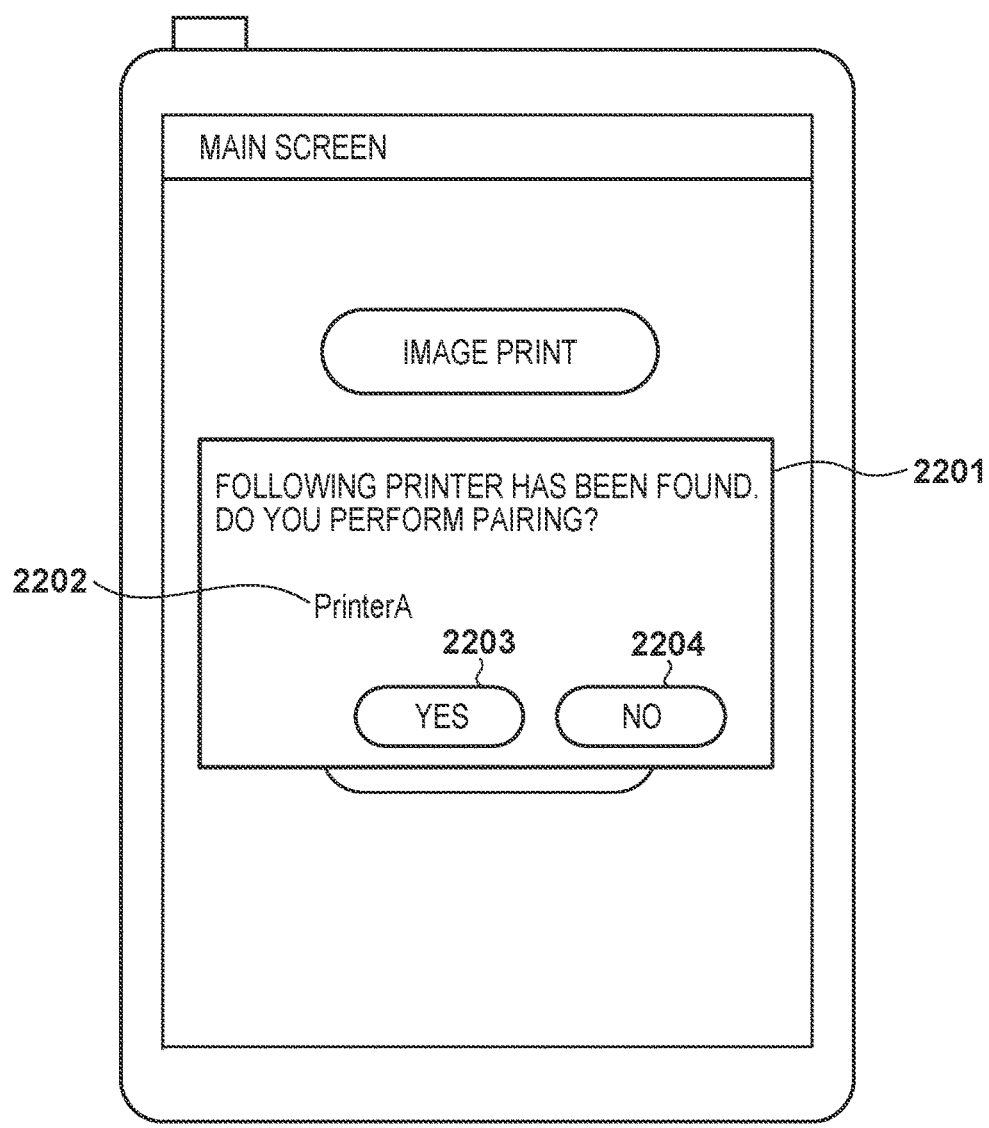

INFORMATION PROCESSING APPARATUS, CONTROL METHOD, AND NON-TRANSITORY COMPUTER-READABLE STORAGE MEDIUM

BACKGROUND OF THE INVENTION

Field of the Invention

The present invention relates to an information presentation technique associated with connection between a communication apparatus and an information processing apparatus.

Description of the Related Art

At present, many apparatuses have a communication function for performing network connection to another apparatus, and connection forms to a network diversify. Japanese Patent No. 5686673 describes a technique of determining whether a wireless communication apparatus currently communicates with an apparatus connected to an existing network created by an access point currently connected to the self apparatus.

The technique described in Japanese Patent No. 5686673 performs the above-described determination processing during communication after connection is established, and does not consider a non-connection state or a state in which connection is disconnected. This poses a problem that when performing connection or restarting disconnected connection, it is impossible to present, to the user, information about an appropriate connection method considering a connection form or a method of restarting disconnected connection.

The present invention presents appropriate information to the user when performing connection or restarting disconnected connection.

SUMMARY OF THE INVENTION

According to one aspect of the present invention, there is provided an information processing apparatus comprising: a first communication unit configured to perform communication with a communication apparatus by a first communication method; a second communication unit configured to perform communication with the communication apparatus by a second communication method different from the first communication method; an obtaining unit configured to obtain, from the communication apparatus, via the second communication unit, information of a state of network connection by the first communication method in the communication apparatus; and a determination unit configured to determine a connection method by the first communication method between the information processing apparatus and the communication apparatus based on the obtained information.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 19A and 19B are views showing an example of the arrangement of an advertising signal;

FIG. 21 is a flowchart illustrating the procedure of pairing processing; and

FIG. 22 is a view showing an example of a confirmation dialog.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(Apparatus Arrangements)

In this embodiment, an information processing apparatus and a communication apparatus are included in a communication system, and the information processing apparatus is, for example, wirelessly communicable with the communication apparatus. This embodiment assumes that the information processing apparatus serves as a smartphone and the communication apparatus serves as a printer. The present invention, however, is not limited to this. The information processing apparatus can be, for example, a mobile terminal, a notebook PC, a tablet terminal, a PDA (Personal Digital Assistant), a digital camera, or the like. The communication apparatus can be any apparatus which can perform wireless communication with the information processing apparatus. For example, if the communication apparatus is a printer, it can be a printer of one of various forms such as an inkjet printer, a full-color laser beam printer, and a monochrome printer. The communication apparatus can be, for example, at least one of a copying machine, a facsimile apparatus, a mobile terminal, a smartphone, a notebook PC, a tablet terminal, a PDA, a digital camera, a music reproduction device, a TV set, and the like. The communication apparatus may also be a multifunctional peripheral having a plurality of functions such as a copy function, a FAX function, and a print function.

Figure 1:
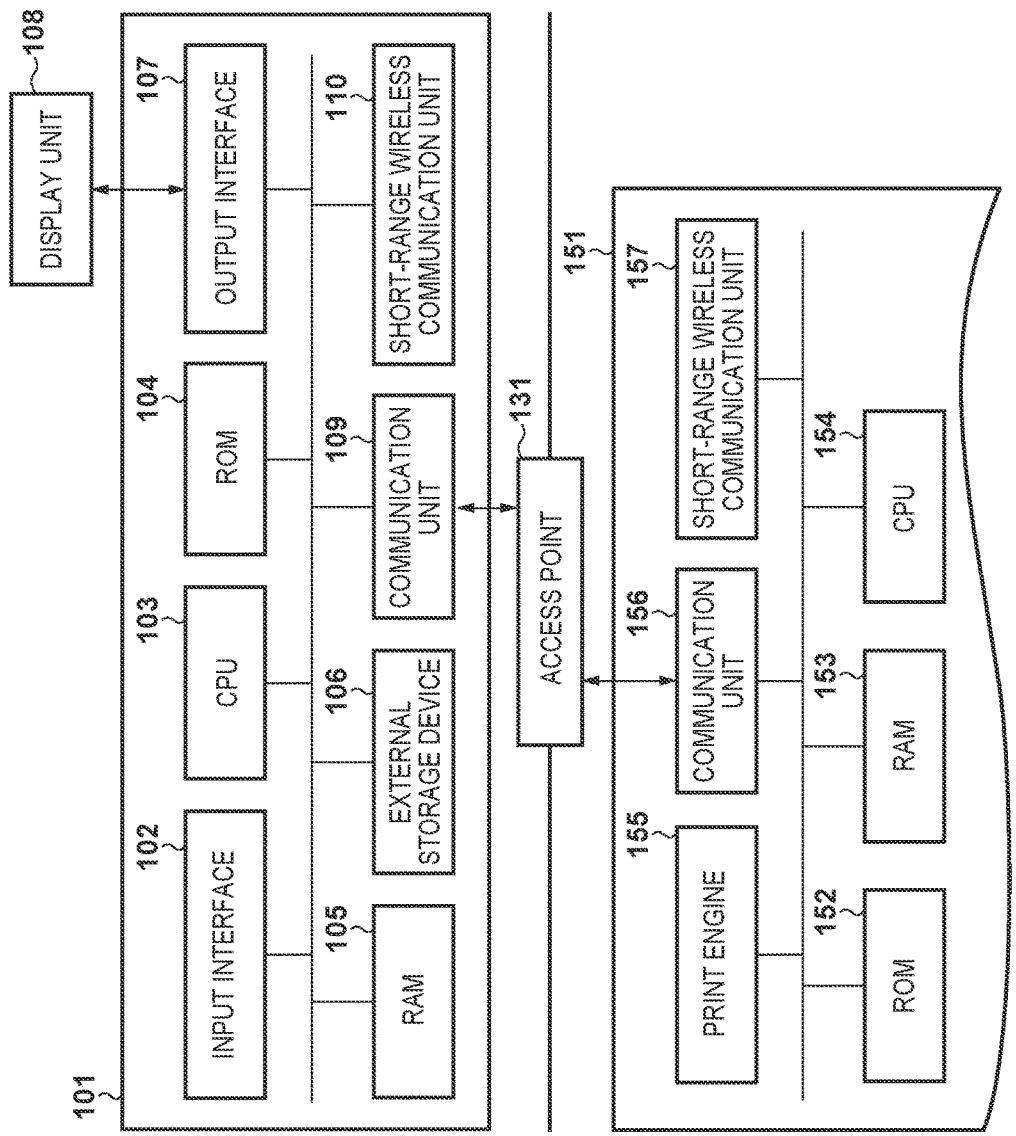
FIG. 1 is a block diagram showing examples of the arrangements of an information processing apparatus and communication apparatus.

Examples of the arrangements of the information processing apparatus and communication apparatus according to this embodiment will be described with reference to FIG. 1. Note that FIG. 1 is merely an example, and the information processing apparatus and the communication apparatus need not always include components shown in FIG. 1, and may include components not shown in FIG. 1. That is, at least some of the components shown in FIG. 1 may be omitted or replaced by other components, and components not shown in FIG. 1 may further be included.

(Arrangement of Information Processing Apparatus)

An information processing apparatus 101 includes, for example, an input interface 102, a CPU 103, a ROM 104, a RAM 105, an external storage device 106, an output interface 107, a display unit 108, a communication unit 109, and a short-range wireless communication unit 110. Note that these components are interconnected via a system bus.

The input interface 102 is an interface for accepting an instruction from the user via an operation unit (not shown) such as a physical keyboard and mouse.

The CPU 103 is a system control unit, and is a processor for controlling the overall information processing apparatus 101 by executing a program or activating hardware. Note that the number of processors such as the CPU 103 need not be one, and a plurality of processors may be included. The ROM 104 is a storage device which holds permanent data such as control programs to be executed by the CPU 103, a data table, and an embedded operating system (to be referred to as an OS hereinafter) program. In this embodiment, the respective control programs stored in the ROM 104 perform software execution control such as scheduling, task switching, and interrupt processing under the management of the embedded OS stored in the ROM 104. The RAM 105 is implemented by an SRAM (Static Random Access Memory), a DRAM (Dynamic Random Access Memory), or the like. Note that the RAM 105 according to this embodiment may hold data by a primary battery (not shown) for data backup. In this case, the RAM 105 can hold important data such as program control variables without volatilizing them. The RAM 105 can be provided with a memory area to store setting information and management data of the information processing apparatus 101 and the like. The RAM 105 can also be used as the main memory and work memory of the CPU 103.

The external storage device 106 holds, for example, application programs for providing various functions. The external storage device 106 stores a program (for example, a printer driver) for generating, when executing some processing in cooperation with a communication partner apparatus, information (for example, a print job) interpretable by the partner apparatus for processing executed by the partner apparatus. For example, in this embodiment, the smartphone (information processing apparatus 101) can execute a print application to transmit data and the like to a printer (communication apparatus 151) as a communication partner apparatus. To do this, the external storage device 106 holds an application for providing a print execution function and a print information generation program for generating a print job interpretable by the communication apparatus 151. The external storage device 106 can also hold various programs such as an information transmission/reception control program for transmitting/receiving information to/from the communication apparatus 151 connected via the communication unit 109, and various kinds of information to be used by these programs.

The output interface 107 is an interface for controlling the display unit 108 to display data and make a notification of the state of the information processing apparatus 101. The display unit 108 is formed by including an LED (Light Emitting Diode) and LCD (Liquid Crystal Display), and displays data and makes a notification of the state of the information processing apparatus 101. The display unit 108 and the above-described operation unit may be at least partially integrated, and may be formed by, for example, a touch panel which implements the output of a screen and acceptance of an operation from the user on the same screen. Note that an input from the user may be accepted via the display unit 108 by displaying, on the display unit 108, a software keyboard including keys such as numerical value input keys, a mode setting key, an enter key, a cancel key, and a power key.

The communication unit 109 is a functional unit which undergoes network connection to an external apparatus such as the communication apparatus 151 to execute data communication. For example, if the communication apparatus 151 functions as an access point, the communication unit 109 can be connected directly to the communication apparatus 151. When the communication unit 109 and the access point function of the communication apparatus 151 are connected to each other, the information processing apparatus 101 and the communication apparatus 151 can communicate with each other. Note that the communication unit 109 may directly communicate with the communication apparatus 151 by wireless communication but may communicate with the communication apparatus 151 via another apparatus (an access point 131) which is different from the information processing apparatus 101 and the communication apparatus 151 and externally exists. Examples of a wireless communication method can be Wi-Fi (Wireless Fidelity)® and Bluetooth®. An example of the other apparatus (access point 131) for relaying communication between the information processing apparatus 101 and the communication apparatus 151 can be a wireless LAN router. Note that in this embodiment, a method of connecting the information processing apparatus 101 and the communication apparatus 151 directly without intervention of another apparatus such as an external access point will be referred to as a direct connection method hereinafter, and a method of connecting the information processing apparatus 101 and the communication apparatus 151 via another apparatus will be referred to as an infrastructure connection method hereinafter.

The information processing apparatus 101 and the communication apparatus 151 can discriminate whether communication between them is executed by the direct connection method or the infrastructure connection method. For example, the information processing apparatus 101 can distinguish the methods based on the name of an SSID (Service Set Identifier) used to communicate with the communication apparatus 151. In an example, a predetermined character string is designated at the beginning of the name of the SSID of the access point used for the direct connection method provided in the communication apparatus 151. With this processing, the information processing apparatus 101 discriminates communication by the direct connection method if there is the character string at the beginning of the name of the SSID used to communicate with the communication apparatus 151, and discriminates communication by the infrastructure connection method when there is another character string at the beginning of the name of the SSID. The communication apparatus 151 can have a function of selecting, for communication of the communication unit 109, the network connection method of itself from the direct connection method and the infrastructure connection method. For example, the communication apparatus 151 selects the network connection method in accordance with a user instruction input via the operation panel of the communication apparatus 151. In accordance with an instruction from the information processing apparatus 101, the communication apparatus 151 may select the network connection method. In this case, the communication apparatus 151 can notify another apparatus of information indicating that network connection has been set by one of these connection methods or no network connection has been set.

The short-range wireless communication unit 110 is a functional unit capable of executing data communication by performing wireless connection to the external apparatus such as the communication apparatus 151 by a short-range wireless communication method different from that of the communication unit 109. The short-range wireless communication unit 110 can be connected to the short-range wireless communication unit 157 in the communication apparatus 151. Note that in this embodiment, Bluetooth Low Energy (BLE) is used as a short-range wireless communication method. That is, the short-range wireless communication unit 110 includes a BLE unit. The BLE unit includes a microcomputer serving as a microprocessor for performing wireless communication processing, and a wireless communication circuit for transmitting/receiving data by wireless communication. A RAM and a flash memory are incorporated in the microcomputer. Note that instead of BLE, for example, NFC (Near Field Communication) or Wi-Fi Aware may be used as the communication method of the short-range wireless communication unit 110.

Note that as described above, the communication unit 109 and the short-range wireless communication unit 110 need only use different communication methods, and the methods are not limited to the communication method related to the wireless LAN and the communication method related to the short-range wireless communication method such as BLE, respectively.

(Arrangement of Communication Apparatus)

The communication apparatus 151 includes, for example, a ROM 152, a RAM 153, a CPU 154, a print engine 155, a communication unit 156, and a short-range wireless communication unit 157. Note that these components are interconnected via a system bus.

The communication unit 156 has, for example, an access point function for performing, as an access point in the communication apparatus 151, connection to an apparatus such as the information processing apparatus 101, and can be connected to the communication unit 109 of the information processing apparatus 101. Note that the communication unit 156 may directly communicate with the information processing apparatus 101 by wireless communication, or communicate with the information processing apparatus 101 via another apparatus such as the access point 131. Furthermore, the communication unit 156 may include hardware functioning as an access point, or operate as an access point by software for causing, for example, a communication circuit operable as a station to function as an access point. The short-range wireless communication unit 157 is a functional unit for performing wireless connection and wireless communication with the short-range wireless communication unit 110 of the partner apparatus such as the information processing apparatus 101 by the short-range wireless communication method. Note that the communication unit 156 and the short-range wireless communication unit 157 have capabilities of performing communication using the same communication methods as those used by the communication unit 109 and short-range wireless communication unit 110 of the information processing apparatus in order to communicate with them.

The RAM 153 is a storage device having the same function as that of the RAM 105. The RAM 153 can be provided with a memory area to store setting information and management data of the communication apparatus 151 and the like. The RAM 153 is also used as the main memory and work memory of the CPU 154, and can function as a reception buffer for temporarily holding information (for example, a print job) received from the information processing apparatus 101 or the like or a storage device for saving various kinds of information. The ROM 152 is a storage device which holds permanent data such as control programs to be executed by the CPU 154, a data table, and an OS program. In this embodiment, the respective control programs stored in the ROM 152 perform software execution control such as scheduling, task switching, and interrupt processing under the management of the embedded OS stored in the ROM 152. The CPU 154 is a system control unit, and is a processor for controlling the overall communication apparatus 151. Note that the CPU 154 need not be implemented by one processor, and a plurality of processors may execute the same processing as that executed by the CPU 154.

The print engine 155 forms an image on a printing medium such as a paper sheet using a printing material such as ink based on the information saved in the RAM 153 and the print job received from the information processing apparatus 101 or the like, and outputs a print result. At this time, since the print job transmitted from the information processing apparatus 101 or the like has a large transmission data amount, and requires high-speed communication, it can be received via the communication unit 156 which can perform communication at a speed higher than that of the short-range wireless communication unit 157. Note that in this embodiment, the communication apparatus 151 serves as a printer, and thus includes the print engine 155. However, the communication apparatus 151 may include a processing unit according to processing executable by itself. For example, if the communication apparatus 151 serves as a scanner, it includes a functional unit for executing a scan. If the communication apparatus 151 serves as a camera, it can include an image capturing functional unit. If the communication apparatus 151 serves as a data storage, it can have a storage function for holding a large amount of data.

Note that a memory such as an external HDD or SD card may be mounted as an optional device on the communication apparatus 151, and the information saved in the communication apparatus 151 may be saved in the memory.

Note that an example of processing sharing between the information processing apparatus 101 and the communication apparatus 151 has been described but processing may be shared in another form.

(Procedure of Communication Processing)

The processing procedure of transmission of advertising information in the BLE standard and GATT (Generic Attribute Profile) communication will now be described. In this embodiment, the short-range wireless communication unit 157 of the communication apparatus 151 operates as an advertiser and a slave device, and the short-range wireless communication unit 110 of the information processing apparatus 101 operates as a scanner and a master device. Thus, transmission of advertising information and a GATT communication start request are executed by the short-range wireless communication unit 157. Note that this division of roles is merely an example, and another form may be used.

Figure 2:
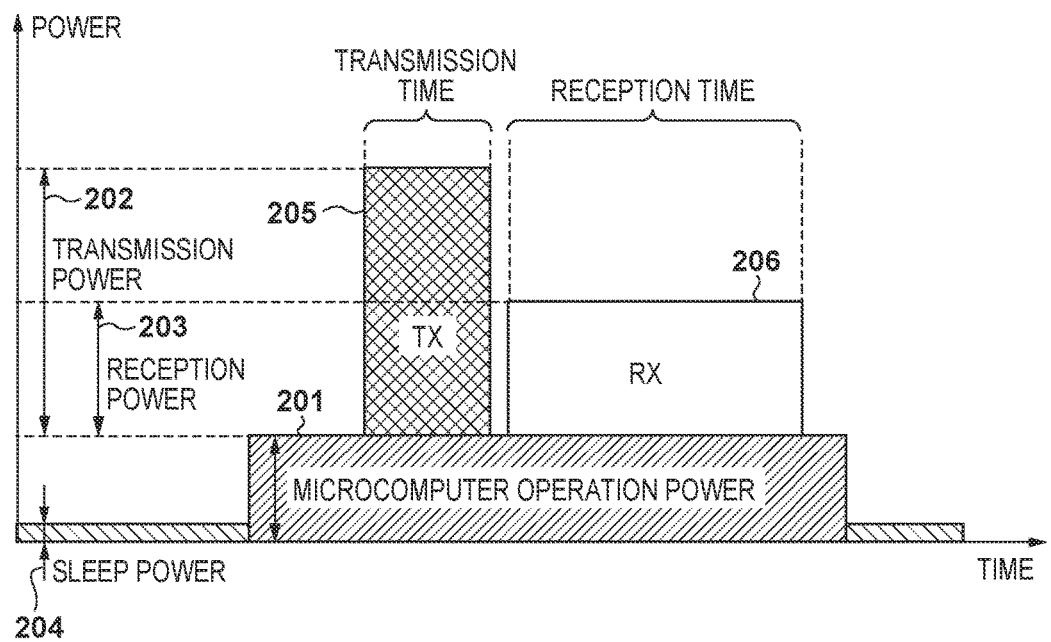
FIG. 2 is a timing chart for explaining processing of transmitting advertising information and receiving connection request information.

The short-range wireless communication unit 157 performs communication using at least one of 40 channels (0th to 39th channels) obtained by dividing a 2.4-GHz frequency band. The short-range wireless communication unit 157 uses the 37th to 39th channels for transmission of the advertising information and reception of the GATT communication start request, and uses the 0th to 36th channels for data communication after BLE connection. In FIG. 2, the ordinate represents the electric power consumption of the short-range wireless communication unit 157 and the abscissa represents the time. FIG. 2 shows the electric power consumption when transmission of the advertising information is waited using one channel and that when the GATT communication start request is waited using one channel. In FIG. 2, TX 205 indicates the total electric power consumption in transmission processing as processing of broadcasting the advertising information. In addition, RX 206 indicates the total electric power consumption in reception processing as processing of activating a receiver for receiving the GATT communication start request from another apparatus. A transmission power 202 indicates instantaneous electric power consumption by the transmission processing, and a reception power 203 indicates instantaneous electric power consumption by the reception processing. A microcomputer operation power 201 indicates instantaneous electric power consumption when the microcomputer in the short-range wireless communication unit 157 operates. Note that the reason why the microcomputer operates before and after TX 205 and RX 206 and between them is that the microcomputer needs to be activated in advance to execute and stop the transmission processing and the reception processing. If the advertising information is transmitted by a plurality of channels, the electric power consumption increases in accordance with the number of channels. While the microcomputer does not operate and the short-range wireless communication unit 157 is in a power saving state, a sleep power 204 is the instantaneous electric power consumption of the short-range wireless communication unit 157. As described above, the short-range wireless communication unit 157 waits until the GATT communication start request is transmitted from the information processing apparatus 101, by performing the transmission processing using a predetermined channel, and then performing reception processing for a predetermined time using the same channel.

Figure 3:
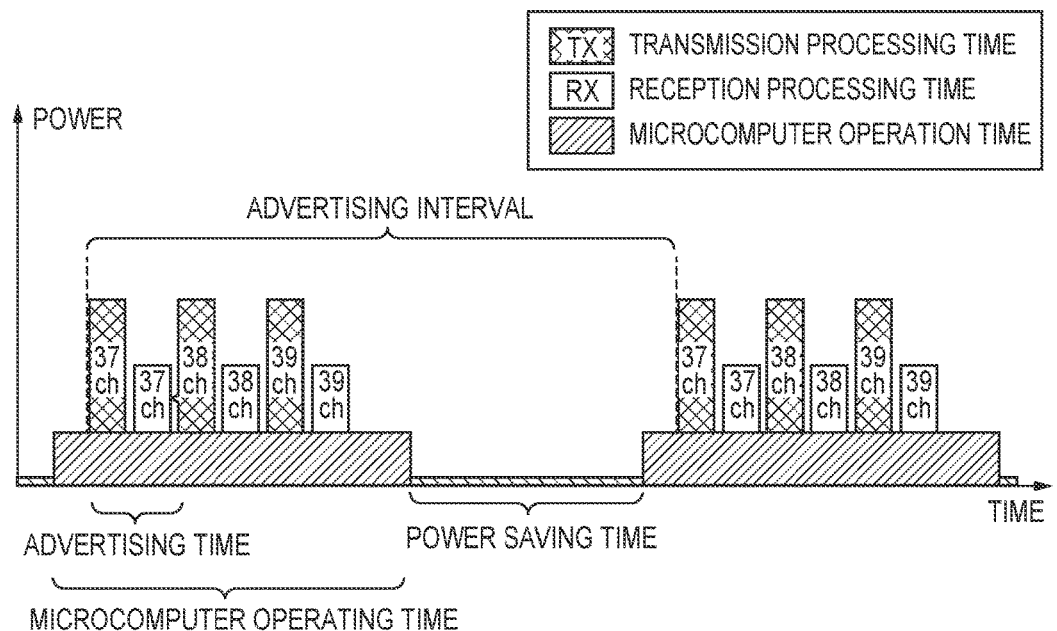
FIG. 3 is a timing chart for explaining advertising in BLE.

As shown in FIG. 3, after repeating the transmission processing and reception processing of the advertising information three times for the respective channels (37th to 39th channels), the short-range wireless communication unit 157 stops the operation of the microcomputer, and is set in the power saving state for a predetermined period. Note that the combination of the transmission processing and reception processing of the advertising information by the predetermined channel will be referred to as advertising hereinafter, and a time interval at which the advertising information is transmitted by the predetermined channel will be referred to as an advertising interval hereinafter. That is, the time interval from when the advertising information is transmitted by a given channel until the advertising information is transmitted next by the same channel is the advertising interval. Note that the number of times advertising is repeated from when the first advertising is performed until the short-range wireless communication unit 157 is set in the power saving state can be arbitrarily changed within the range of three or less.

(Handover by BLE Communication Method)

Figure 10:
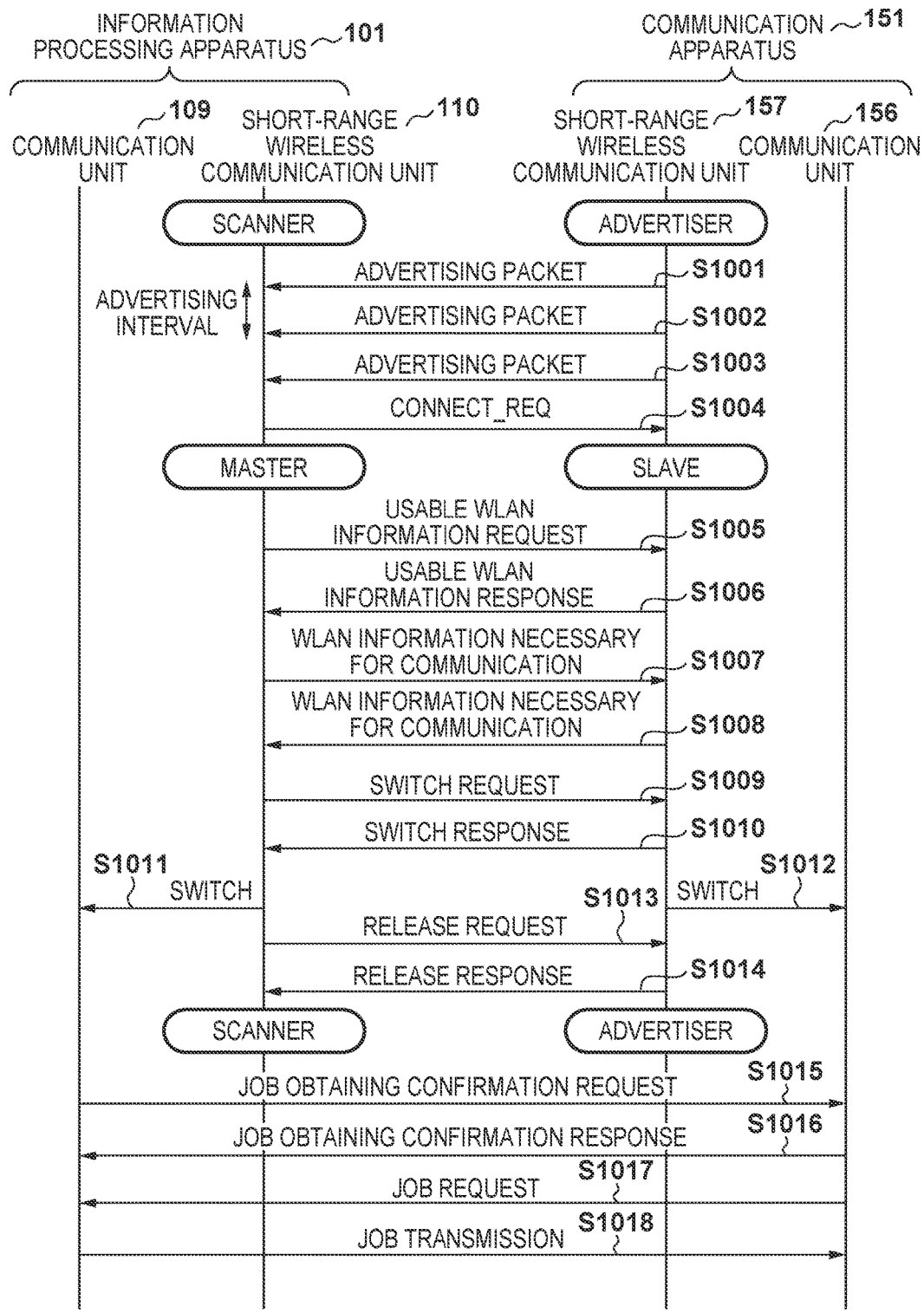
FIG. 10 is a sequence chart showing an example of the procedure of processing when pairing is performed by BLE communication.

Processing from when Wi-Fi connection is started via GATT communication after pairing of the information processing apparatus 101 and the communication apparatus 151 until a print job is transmitted will be described with reference to FIG. 10. Note that a case in which the information processing apparatus 101 and the communication apparatus 151 transmit/receive a job after performing a handover will be exemplified. Note also that a handover is a technique in which the communication apparatus and its partner apparatus use a short-range wireless communication method (for example, BLE) to exchange connection information for communication by a high-speed wireless communication method (for example, Wi-Fi), and then switch the communication method to the high-speed wireless communication method. The communication speed of GATT communication (two-way communication enabled by establishing BLE connection between the apparatuses) is lower than that of Wi-Fi communication. Thus, authentication between the apparatuses, exchange of the connection information for Wi-Fi communication, and the like are performed in GATT communication, and a large amount of data (in this example, the job) is transferred by Wi-Fi communication having the high communication speed, thereby implementing efficient data transfer. Note that the communication method used in a handover is not limited to the above-described two methods, and various communication methods can be used as the short-range communication method and the high-speed wireless communication method. For example, an arrangement is also possible in which the connection information for Wi-Fi communication is exchanged by NFC communication or Wi-Fi Aware communication, and then data is exchanged by Wi-Fi communication. Pairing processing will be described later with reference to FIGS. 18A and 18B.

Note that the processing of the communication apparatus 151 indicated by the processing sequence can be implemented when the CPU 154 loads the control programs stored in the ROM 152 or the HDD (not shown) of the communication apparatus 151 into the RAM 153 and executes them. The processing of the information processing apparatus 101 indicated by the processing sequence can be implemented when the CPU 103 loads the control programs stored in the ROM 104 or the HDD (not shown) of the information processing apparatus 101 into the RAM 105, and executes them.

As described above, assume that the communication apparatus 151 according to this embodiment serves as an advertiser which transmits the advertising information at predetermined intervals, and the information processing apparatus 101 according to this embodiment serves as a scanner which waits for the advertising information transmitted from the peripheral advertiser. First, the short-range wireless communication unit 157 of the communication apparatus 151 transmits the advertising information (S1001 to S1003). When an image print button 2012 or document print button 2013 in the print application is pressed, the short-range wireless communication unit 110 of the information processing apparatus 101 starts a search for the advertising information transmitted from the short-range wireless communication unit 157. This makes it possible to recognize the existence of the communication apparatus 151. Note that a search for the advertising information may start at another timing. For example, a search may start at a timing when an image is selected in FIG. 20D or a timing when the print application is activated. The information processing apparatus 101 can recognize the existence of the communication apparatus 151 by receiving, in the short-range wireless communication unit 110, the advertising information transmitted from the short-range wireless communication unit 157. In addition, if pairing is not complete before the start of the processing of FIG. 10, pairing processing is executed at the timing of receiving the advertising information.

Upon recognizing the communication apparatus 151 and determining to establish connection to the communication apparatus 151, the information processing apparatus 101 transmits connection request information to the communication apparatus 151. For example, the information processing apparatus 101 displays the name of the communication apparatus 151 and the like contained in the advertising information, and inquires of the user whether to start connection. If the user instructs to start connection to the communication apparatus 151, the short-range wireless communication unit 110 of the information processing apparatus 101 transmits "CONNECT_REQ" as a request to transit to a connection event of establishing network connection by BLE (S1004). When the short-range wireless communication unit 157 of the communication apparatus 151 receives CONNECT_REQ, the information processing apparatus 101 and the communication apparatus 151 are prepared to transit to the connection event. For example, the short-range wireless communication units 110 and 157 respectively notify the CPUs 103 and 154 of completion of the connection processing for GATT communication. After that, the information processing apparatus 101 and the communication apparatus 151 respectively transit from the scanner and advertiser to the master and slave, and connection (BLE connection) for GATT communication is established between the information processing apparatus 101 serving as the master and the communication apparatus 151 serving as the slave. Note that in the BLE standard, the master can form a one-to-many star topology with slaves. Upon establishing BLE connection, the information processing apparatus 101 and the communication apparatus 151 can perform data communication by the GATT communication method (S1005 to S1010, S1013, and S1014).

After that, the short-range wireless communication unit 110 of the information processing apparatus 101 requests, of the short-range wireless communication unit 157 of the communication apparatus 151, information of a communication protocol usable by the communication apparatus 151 (S1005). Note that this request contains information of a communication protocol usable by the information processing apparatus 101. Upon receiving this request, the short-range wireless communication unit 157 of the communication apparatus 151 can recognize that the information processing apparatus 101 can use the communication method such as Wi-Fi. In response to the request received in S1005, the short-range wireless communication unit 157 of the communication apparatus 151 transmits a response signal containing information of the communication protocol usable by itself (S1006). This allows the information processing apparatus 101 and the communication apparatus 151 to grasp the communication protocol other than BLE, which is usable by one another.

Assume that after the information processing apparatus 101 and the communication apparatus 151 grasp the communication protocol other than BLE, which is usable by one another, the information processing apparatus 101 determines to switch communication between the apparatuses to Wi-Fi communication. Note that the communication apparatus 151 may determine whether to switch the communication method. Upon determining to switch the communication method, the information processing apparatus 101 and the communication apparatus 151 exchange communication information necessary to perform Wi-Fi communication, such as SSID information and address information for specifying the communication partner (S1007 and S1008). For example, after that, the short-range wireless communication unit 110 of the information processing apparatus 101 transmits a request (switch request) to switch the communication method between the apparatuses from GATT communication to Wi-Fi communication (S1009). Upon receiving the switch request, the short-range wireless communication unit 157 of the communication apparatus 151 transmits a response signal to the request (S1010).

If the switch request and response are successfully transmitted, the information processing apparatus 101 switches the communication unit used for communication with the communication apparatus 151 from the short-range wireless communication unit 110 to the communication unit 109 (S1011). Similarly, the communication apparatus 151 switches the communication unit used for communication with the information processing apparatus 101 from the short-range wireless communication unit 157 to the communication unit 156 (S1012). After switching them, the short-range wireless communication unit 110 of the information processing apparatus 101 transmits a release request (S1013). Upon receiving the release request, the short-range wireless communication unit 157 of the communication apparatus 151 transmits a release response, and terminates BLE connection between the apparatuses (S1014). After BLE connection is terminated, the information processing apparatus 101 and the communication apparatus 151 respectively return to the scanner and the advertiser, and the short-range wireless communication unit 157 of the communication apparatus 151 restarts transmission of the advertising information.

After that, the information processing apparatus 101 and the communication apparatus 151 perform Wi-Fi communication using the information necessary to perform Wi-Fi communication, which has been exchanged in S1007 and S1008. The communication unit 109 of the information processing apparatus 101 transmits, to the communication unit 156 of the communication apparatus 151, a request to confirm whether the communication apparatus 151 can obtain a job (S1015). In this example, for example, information of the free capacity of the storage device for temporarily saving an image to be transferred to the communication apparatus 151 or the like is confirmed. After receiving the confirmation request, the communication unit 156 of the communication apparatus 151 transmits a response signal to the confirmation request (S1016).

If it is determined that the communication apparatus 151 can obtain a job, the communication unit 156 of the communication apparatus 151 requests the job (S1017). Upon receiving the job request, the communication unit 109 of the information processing apparatus 101 transmits, to the communication unit 156 of the communication apparatus 151, a print job containing image data and the like existing in the information processing apparatus 101 (S1018). Note that a job to be transmitted can be selected at various timings, for example, before BLE connection is established, after BLE connection is established, and after Wi-Fi connection is established. The job to be transmitted is not limited to the print job, and may be, for example, a scan job for instructing the communication apparatus 151 to perform a scan, or a job for causing the information processing apparatus 101 to obtain information of the state of the communication apparatus 151. The job may be, for example, a command for executing various operations for the communication apparatus 151 such as a change of the setting of the communication apparatus 151. Note that when transmission of the job is complete, the information processing apparatus 101 disconnects Wi-Fi connection from the communication apparatus 151 and returns to a network state immediately before the handover is performed. For example, if the information processing apparatus 101 is connected to a mobile telecommunications network such as 3G or LTE or an access point such as a router before the handover is executed, it reestablishes connection to the mobile telecommunications network or the access point. To do this, before the handover is executed, the information processing apparatus 101 holds information of the network state immediately before the handover, communication information necessary to establish connection to the network, and the like.

By using the handover technique as described above, it is possible to exchange, by the communication method (short-range communication method) with high usability, connection information for communication by the high-speed wireless communication method, and then exchange a large amount of data at high speed by the high-speed wireless communication method.

(Example of Screen Displayed by Application)

Figure 4:
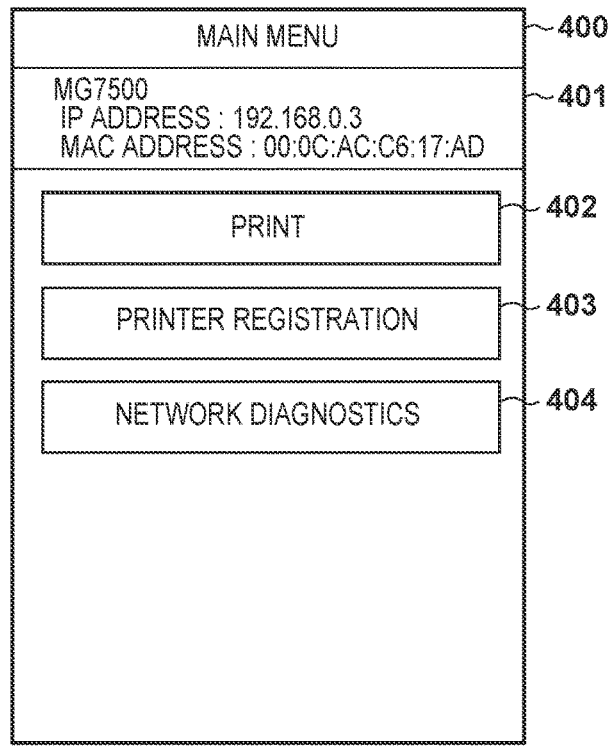
FIG. 4 is a view showing an example of the main screen of an application.
Figure 5:
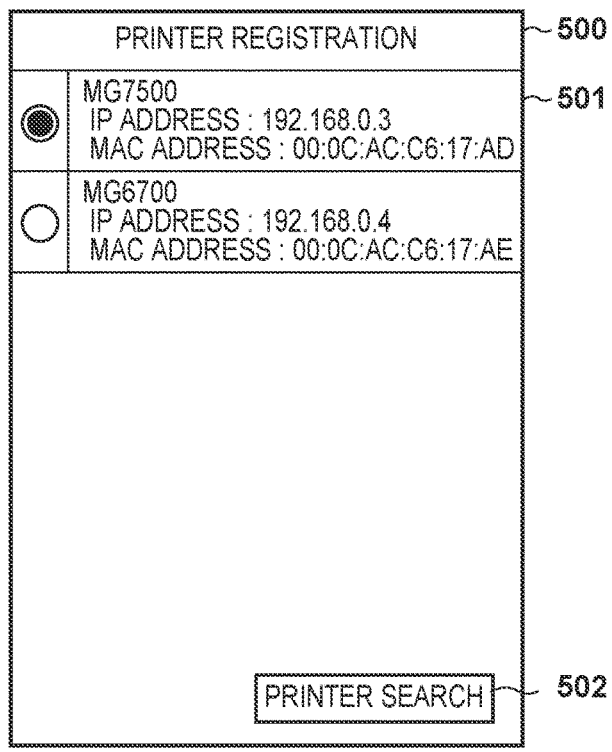
FIG. 5 is a view showing an example of the printer registration screen of the application.
Figure 6:
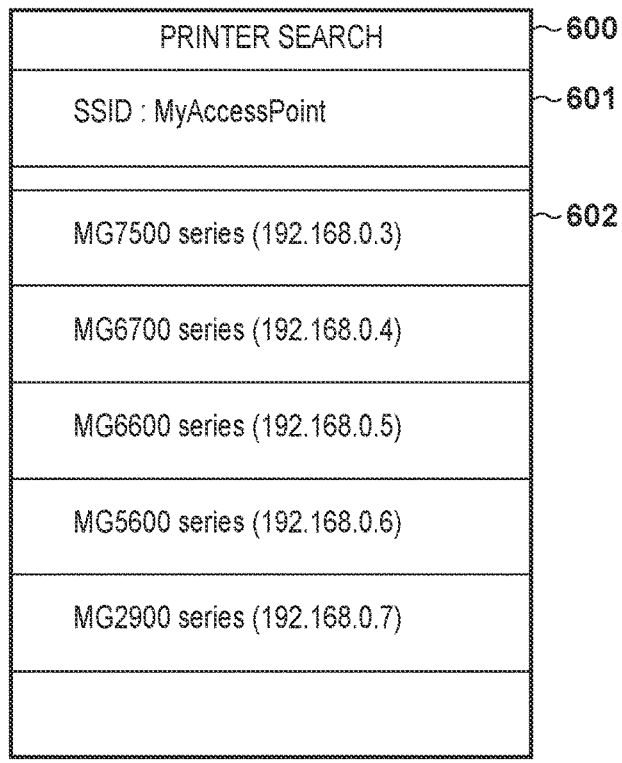
FIG. 6 is a view showing an example of the printer search screen of the application.

An example of a screen displayed by the application of the information processing apparatus 101 according to this embodiment will be described with reference to FIGS. 4 to 6. Note that an example in which the communication apparatus 151 serves as a printer, as described above, will be explained below. Although screens shown in FIGS. 4 to 6 are partially different from those shown in FIGS. 20A to 20F (to be described later), FIG. 4 basically corresponds to FIG. 20B, and FIG. 5 shows a screen displayed when a printer registration button 403 shown in FIG. 4 or a printer registration button 2014 shown in FIG. 20B is pressed. Furthermore, FIG. 6 shows a screen displayed when a printer search button 502 is pressed, and corresponds to a search result screen shown in FIG. 20C.

FIG. 4 is a view showing an example of a main screen 400 of the application. The screen of FIG. 4 is displayed in response to, for example, activation of the application in the information processing apparatus 101. The main screen 400 includes a printer information display region 401, a print button 402, a printer registration button 403, and a network diagnostics button 404. Information of a registered printer is displayed in the printer information display region 401. Note that in this embodiment, "registration" of a printer is to obtain and store various kinds of information of the target printer by the application in order for the application to cause the printer to execute print processing. For example, a printer name given by the user at the time of printer registration, and the IP address and MAC address of the printer are displayed in the printer information display region 401. Note that if there is no registered printer, information indicating that there is no registered printer is displayed in the printer information display region 401. Upon the pressing of the print button 402, the screen transits to a print screen (for example, FIG. 20D). On the print screen, it is possible to instruct to print image data or document data saved in the information processing apparatus 101, or data obtainable by the information processing apparatus 101 via the communication unit, and cause the printer to execute printing in accordance with the instruction. Upon tapping of the printer registration button 403, the screen transits to a printer registration screen. Printer registration processing will be described in detail later. Upon the pressing of the network diagnostics button 404, network diagnostics processing starts. The network diagnostics processing will also be described in detail later.

FIG. 5 is a view showing an example of a printer registration screen 500 by the application. The screen of FIG. 5 includes, for example, a registered printer display region 501 and the printer search button 502. A list of registered printers is displayed in the registered printer display region 501. This display region includes a radio button indicating a currently selected printer, and is configured to set a printer to be used by the application. The IP address and MAC address of each registered printer usable by the application are displayed in the registered printer display region 501. Upon the pressing of the printer search button 502, the screen transits to a printer search screen shown in FIG. 6 (to be described later). After a new printer selected from printers found by a printer search is registered, the printer is displayed in the registered printer display region 501.

FIG. 6 is a view showing an example of a printer search screen 600 by the application. Note that the screen of FIG. 6 is displayed when the printer search button of FIG. 5 is pressed. The printer search screen 600 includes an SSID display region 601 and a detected printer display region 602. An SSID set in a system incorporated in the information processing apparatus 101 is displayed in the SSID display region 601. That is, the information processing apparatus 101 is currently connected to an access point with an SSID "MyAccessPoint". When transiting to the printer search screen 600, this application searches for a printer in the same network as that of the communication apparatus having the SSID of the communication destination. At the time of the search, a communication protocol such as SNMP (Simple Network Management Protocol) capable of recognizing a printer can be used. With the search processing, an IP address and MAC address corresponding to each printer are obtained. A list of thus detected printers is displayed in the detected printer display region 602. When the user presses and selects a desired printer from the list of detected printers displayed in the detected printer display region 602, a printer name setting screen (not shown) is displayed. When an arbitrary printer name is input to the screen, the printer is registered with the input name. At the time of printer registration, the information processing apparatus 101 communicates with the printer to obtain, from the printer, printer capability information required at the time of printing. The capability information includes information such as a paper type and paper size usable by the printer. Furthermore, the information processing apparatus 101 holds, at the time of printer registration, the input printer name, the SSID information used at the time of the search, the IP address, the MAC address, and the capability of the printer in association with each other.

(Procedure of Processing)

The procedure of processing executed by the information processing apparatus 101 according to this embodiment will be described with reference to FIGS. 7 to 9. Note that a flowchart executed by the information processing apparatus 101 according to the present invention is implemented when the CPU 103 reads out programs associated with the flowchart from the ROM or the like and executes them.

Figure 7:
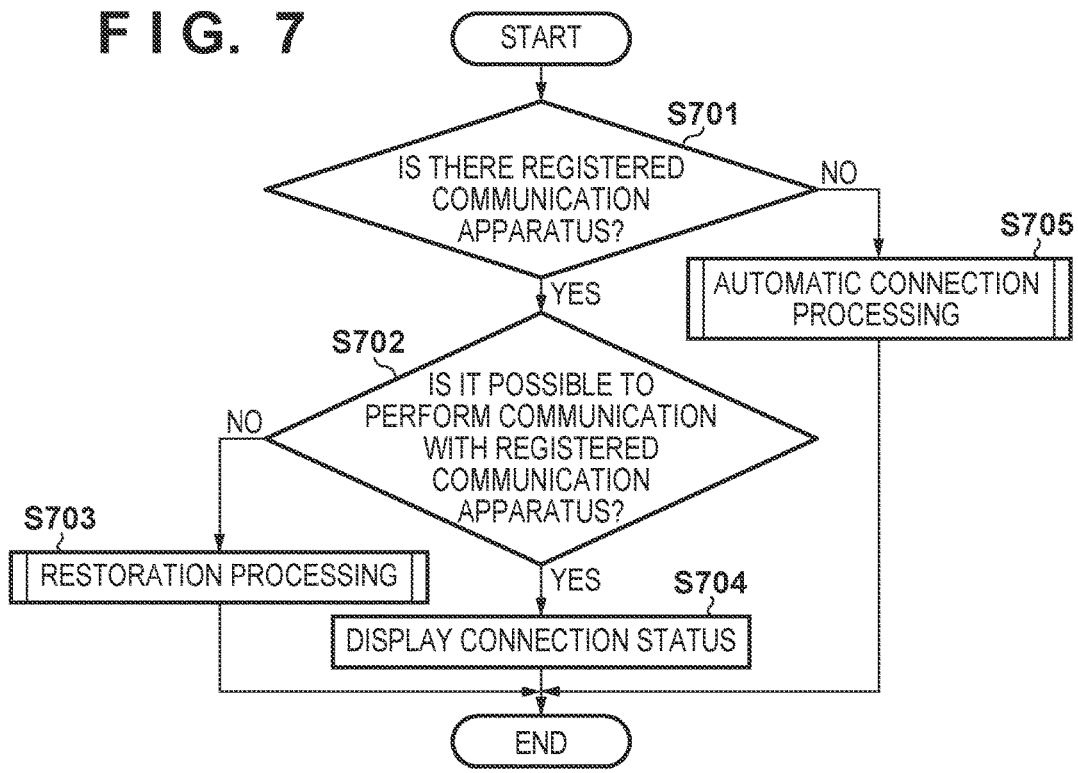
FIG. 7 is a flowchart illustrating an example of the procedure of the communication control processing of the information processing apparatus.

FIG. 7 is a flowchart illustrating an example of the procedure of the communication control processing of the information processing apparatus 101 according to this embodiment. This processing starts at a timing when, for example, the main screen 400 of FIG. 4 is displayed and the network diagnostics button 404 is pressed. Note that if no pairing processing is executed before the processing of FIG. 7, the information processing apparatus 101 executes pairing processing at a timing when the network diagnostics button 404 is pressed. More specifically, at a timing when the network diagnostics button 404 is pressed, the information processing apparatus 101 starts a search for an advertising signal, and executes pairing processing shown in FIG. 21 (to be described later). In this processing, the information processing apparatus 101 first determines whether there is a registered printer (communication apparatus), that is, whether a registered printer is displayed in the printer information display region 401 of the main screen 400 (step S701). If it is determined that there is a registered printer (YES in step S701), the information processing apparatus 101 advances the process to step S702; otherwise (NO in step S701), the information processing apparatus 101 determines that no printer is registered, and executes automatic connection processing in step S705. Note that the information processing apparatus 101 may determine in step S701 whether a desired printer (communication apparatus) is registered. That is, even if some printer is registered, if no desired printer is registered, the process may shift to step S705. In the automatic connection processing, in accordance with a network connection state set on the printer side (for example, in accordance with whether the connection setting is made or in accordance with the connection method used), the information processing apparatus 101 executes processing of performing connection to the printer by an appropriate connection method. The procedure of the automatic connection processing will be described in detail later with reference to FIG. 8.

In step S702, the information processing apparatus 101 confirms whether it is possible to perform communication with the registered printer. The information processing apparatus 101 can execute this confirmation processing by attempting some communication (for example, transmission of a predetermined signal and reception of a response to it) using the registered IP address or the like. If it is determined that it is impossible to perform communication with the registered printer (NO in step S702), the information processing apparatus 101 advances the process to step S703. If it is impossible to perform communication with the registered printer, for example, the setting of the printer may be changed. To cope with this, the information processing apparatus 101 shifts to a restoration mode to enter a state in which it can be connected to the printer using information set in the printer when it is registered. The restoration mode will be described in detail later with reference to FIG. 9. On the other hand, if it is determined that it is possible to perform communication with the registered printer (YES in step S702), the information processing apparatus 101 displays the status of connection to the printer (step S704). More specifically, the information processing apparatus 101 creates a network connection status display screen (to be described later) based on information about network connection, which has been saved at the time of printer registration.

Figure 11:
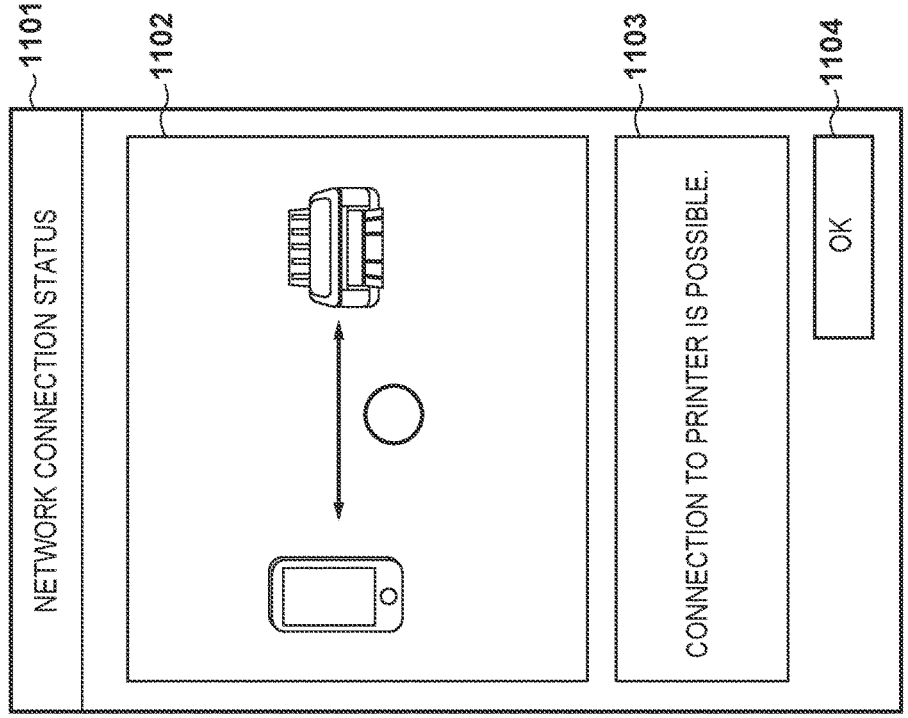
FIG. 11 is a view showing an example of a screen indicating the connection state between the apparatuses.
Figure 12:
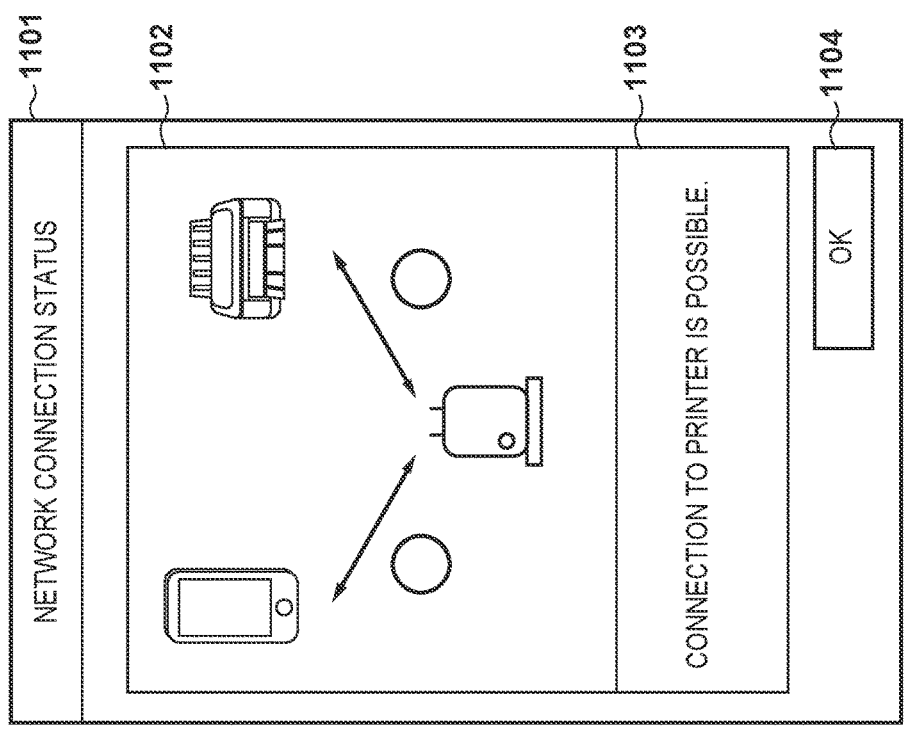
FIG. 12 is a view showing another example of the screen indicating the connection state between the apparatuses.

FIGS. 11 and 12 each show a network connection status display screen 1101 which is displayed on the screen of the information processing apparatus 101 in step S704 and indicates the connection status between the information processing apparatus 101 and the printer. The network connection status display screen 1101 includes an image description region 1102 in which the connection state between the information processing apparatus 101 and the printer is described by an image, a document description region 1103 in which the connection status is described by text, and an OK button 1104. FIG. 11 shows an example of the screen which is displayed when the information processing apparatus 101 and the printer are connected by the infrastructure connection method. That is, the information processing apparatus 101 creates the screen of FIG. 11 based on information indicating the infrastructure connection method, which is saved as information about the network connection of the printer at the time of registration. An image indicating that the information processing apparatus 101 (left) and the printer (right) are connected via the access point 131 (lower) is displayed in the image description region 1102. Note that if the SSID of the access point is saved as the information about the network connection of the printer at the time of registration, the information processing apparatus 101 may display the SSID on the object of the access point on the screen of FIG. 11. A message indicating that the information processing apparatus 101 can be connected to the printer is displayed in the document description region 1103. On the other hand, FIG. 12 shows an example of the screen displayed when the information processing apparatus 101 and the printer are connected by the direct connection method. At this time, an image indicating that the information processing apparatus 101 and the printer are connected directly without intervention of another apparatus is displayed in the image description region 1102. Note that the information processing apparatus 101 may display the printer name on the object of the printer in FIG. 11 or 12 by obtaining, from the external storage device 106, the printer name at the time of registration.

Figure 8:
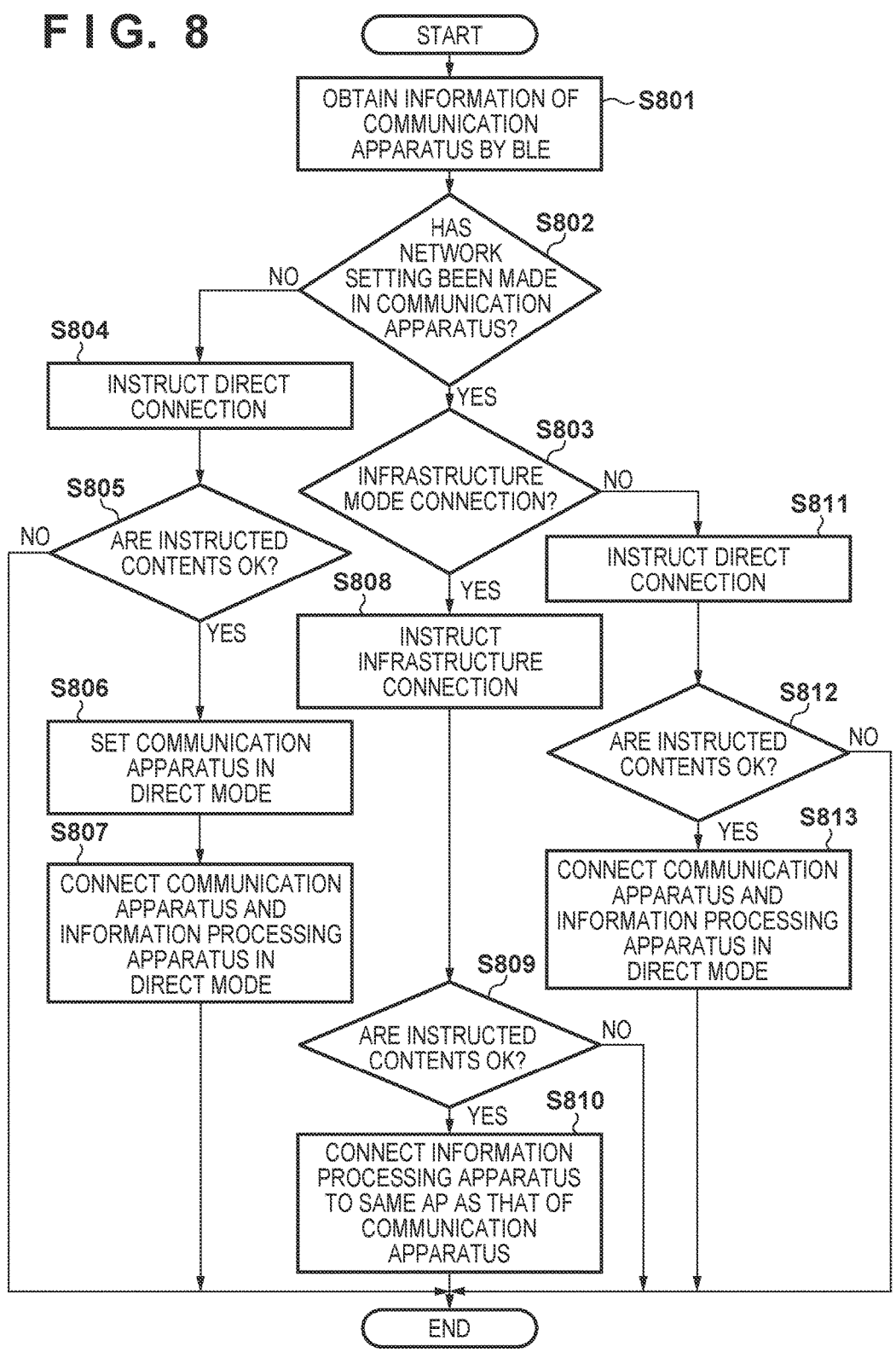
FIG. 8 is a flowchart illustrating an example of the procedure of automatic connection processing.

FIG. 8 is a flowchart illustrating an example of the procedure of the automatic connection processing executed in step S705 of FIG. 7. The information processing apparatus 101 performs GATT communication with the printer by BLE, and obtains the information about the network connection method from the printer (step S801). If the network connection method of the printer is the infrastructure connection method, the information processing apparatus 101 obtains the SSID information of the access point connected to the printer. GATT communication by BLE is executed by the method described above with reference to FIG. 10. Based on the information obtained in step S801, the information processing apparatus 101 can discriminate whether the network connection method of the printer is the direct connection method or the infrastructure connection method, or whether no network connection setting has been made. After that, if, in accordance with the network connection state of the printer, it is determined that no network setting has been made (NO in step S802), the information processing apparatus 101 advances the process to step S804. On the other hand, if it is determined that the network setting has been made (YES in step S802), the information processing apparatus 101 advances the process to step S803. In step S804, the information processing apparatus 101 displays a guide indicating that connection to the printer is performed by the direct connection method which makes it possible to perform communication with the printer without intervention of the access point 131.

Figure 13:
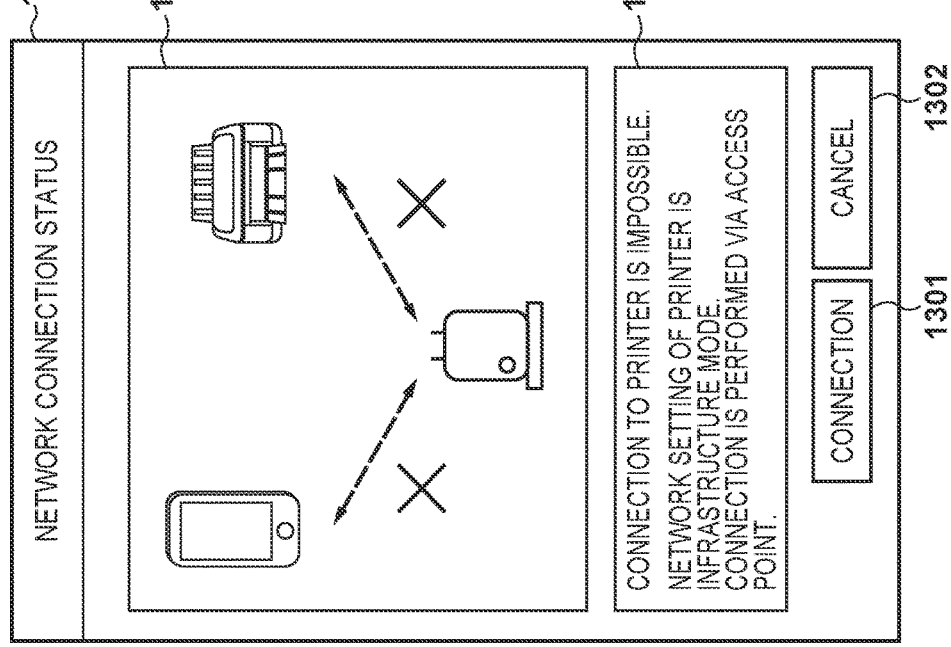
FIG. 13 is a view showing an example of a guide screen for connection setting including the connection form between the apparatuses.

FIG. 13 shows the screen displayed in step S804. The screen arrangement is almost the same as that shown in FIG. 11 except that there is no OK button 1104 in FIG. 13 and a connection button 1301 and a cancel button 1302 are included. In FIG. 13, an image indicating that the apparatus is connected to the printer by the direct connection method is displayed in the image description region 1102. A message including information indicating that the apparatus cannot be connected to the printer, information indicating that the network connection form of the printer is set, and information indicating that the apparatus is connected to the printer by the direct connection method is displayed in the document description region 1103.

If it is determined that the connection button 1301 has been pressed on the screen displayed in step S804 (YES in step S805), the information processing apparatus 101 performs GATT communication with the printer by BLE. The information processing apparatus 101 transmits a connection mode setting instruction to the printer by GATT communication to instruct the printer to set the network connection form to the direct connection method (step S806). More specifically, the information processing apparatus 101 instructs the printer to activate the access point in the printer. In response to this instruction, the printer activates the access point of itself. After activating the access point, the printer transmits the SSID of the activated access point to the information processing apparatus 101 by GATT communication. After the printer sets the network connection form to the direct connection method, the information processing apparatus 101 is connected to the printer by the direct connection method (step S807). More specifically, after the instruction in step S806 described above, the information processing apparatus 101 obtains the SSID of the access point in the printer. The information processing apparatus 101 executes connection processing to the access point of the SSID. Note that if the cancel button 1302 is pressed on the screen displayed in step S804 (NO in step S805), the information processing apparatus 101 ends the process without performing connection to the printer, and returns to the main screen of FIG. 4.

In step S803, based on the information obtained in step S801, the information processing apparatus 101 determines whether the network connection form of the printer is the infrastructure connection method. If it is determined that the network connection method of the printer is the infrastructure connection method (YES in step S803), the information processing apparatus 101 advances the process to step S808. If it is determined that the network connection method of the printer is the direct connection method (NO in step S803), the information processing apparatus 101 advances the process to step S811.

Figure 14:
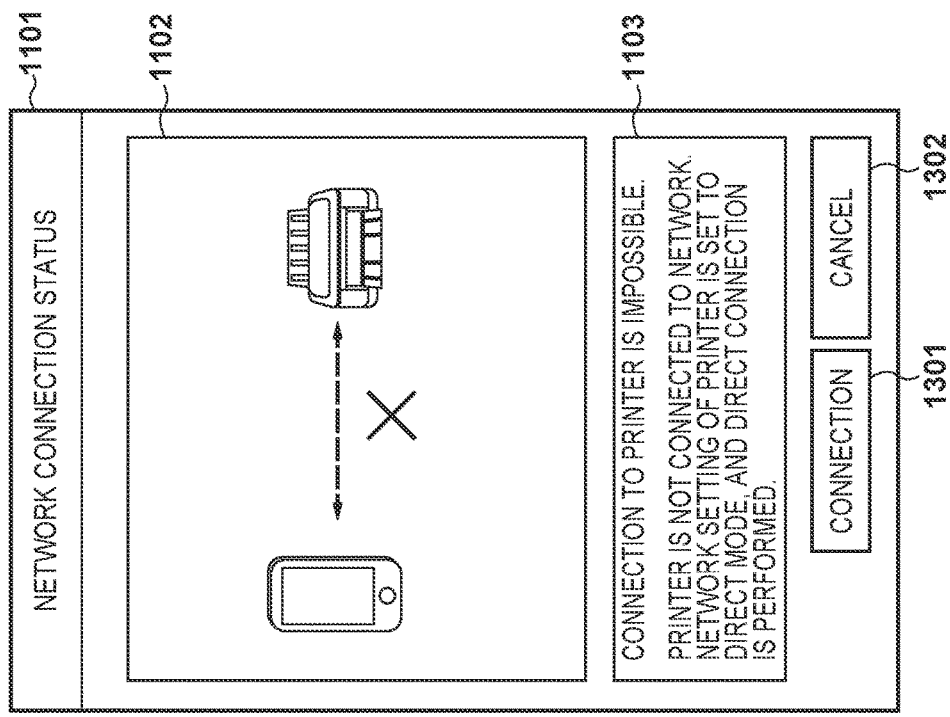
FIG. 14 is a view showing an example of a guide screen for connection setting including the connection form between the apparatuses.

FIG. 14 is a view showing an example of the screen displayed in step S808. In FIG. 14, an image indicating that the information processing apparatus 101 and the printer are connected by the infrastructure connection method is displayed in the image description region 1102. A message including information indicating that the apparatus cannot be connected to the printer and information indicating that the apparatus is connected to the printer by the infrastructure connection method is displayed in the document description region 1103.

If it is determined that the connection button 1301 has been pressed on the screen displayed in step S808 (YES in step S809), the information processing apparatus 101 is connected to the printer by the infrastructure connection method (step S810). That is, in step S810, the information processing apparatus 101 performs connection processing to the access point 131 currently connected to the printer (step S810). Note that the information (for example, the SSID and the like) of the access point 131 currently connected to the printer is also obtained by the processing in step S801. In consideration of security, the information transmitted from the printer in step S801 may be configured not to contain a password. In this case, when connecting the information processing apparatus 101 and the printer, a screen for inputting a password is displayed on the information processing apparatus 101. On the other hand, if it is determined that the cancel button 1302 has been pressed on the screen displayed in step S808 (NO in step S809), the information processing apparatus 101 ends the process without performing connection to the printer, and returns to the main screen of FIG. 4.

Figure 15:
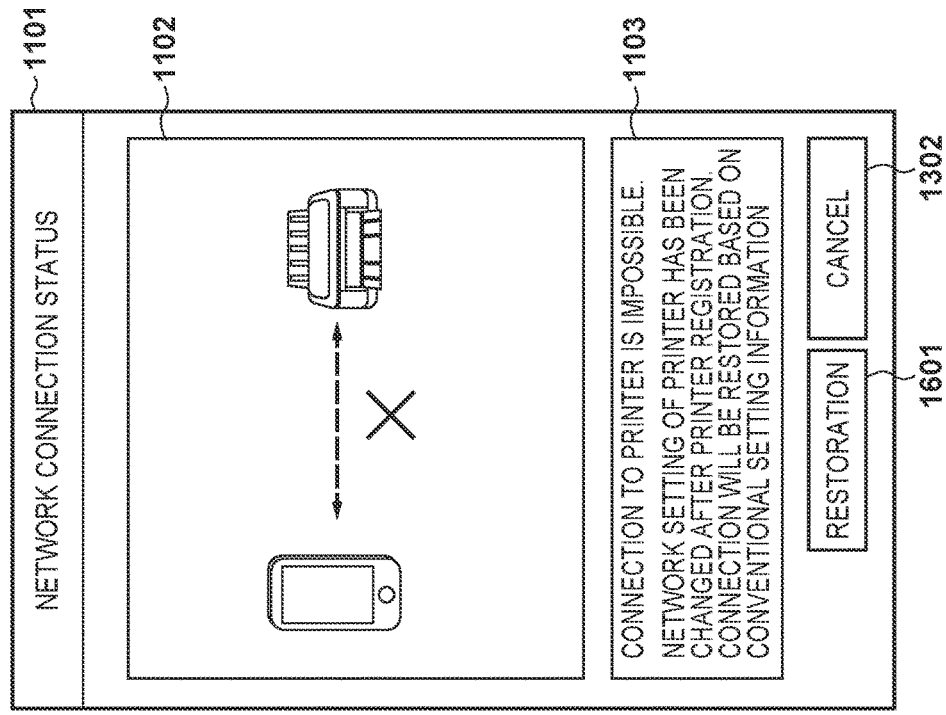
FIG. 15 is a view showing an example of a guide screen for connection setting including the connection form between the apparatuses.

FIG. 15 is a view showing an example of the screen displayed in step S811. In FIG. 15, an image indicating that the information processing apparatus 101 and the printer are connected by the direct connection method is displayed in the image description region 1102. A message including information indicating that the apparatus cannot be connected to the printer and information indicating that the apparatus is connected to the printer by the direct connection method is displayed in the document description region 1103. If the connection button 1301 is pressed on the screen displayed in step S811 (YES in step S812), the information processing apparatus 101 is connected to the printer by the direct connection method (step S813). Note that since the information processing apparatus 101 has obtained the SSID, password, and the like of the access point in the printer in step S801, it executes direct connection using these pieces of information in the processing in step S813. On the other hand, if the cancel button 1302 is pressed on the screen displayed in step S811 (NO in step S812), the information processing apparatus 101 ends the process without performing connection to the printer. Note that the processing in step S813 is the same as that in step S807 and a detailed description thereof will be omitted.

Figure 9:
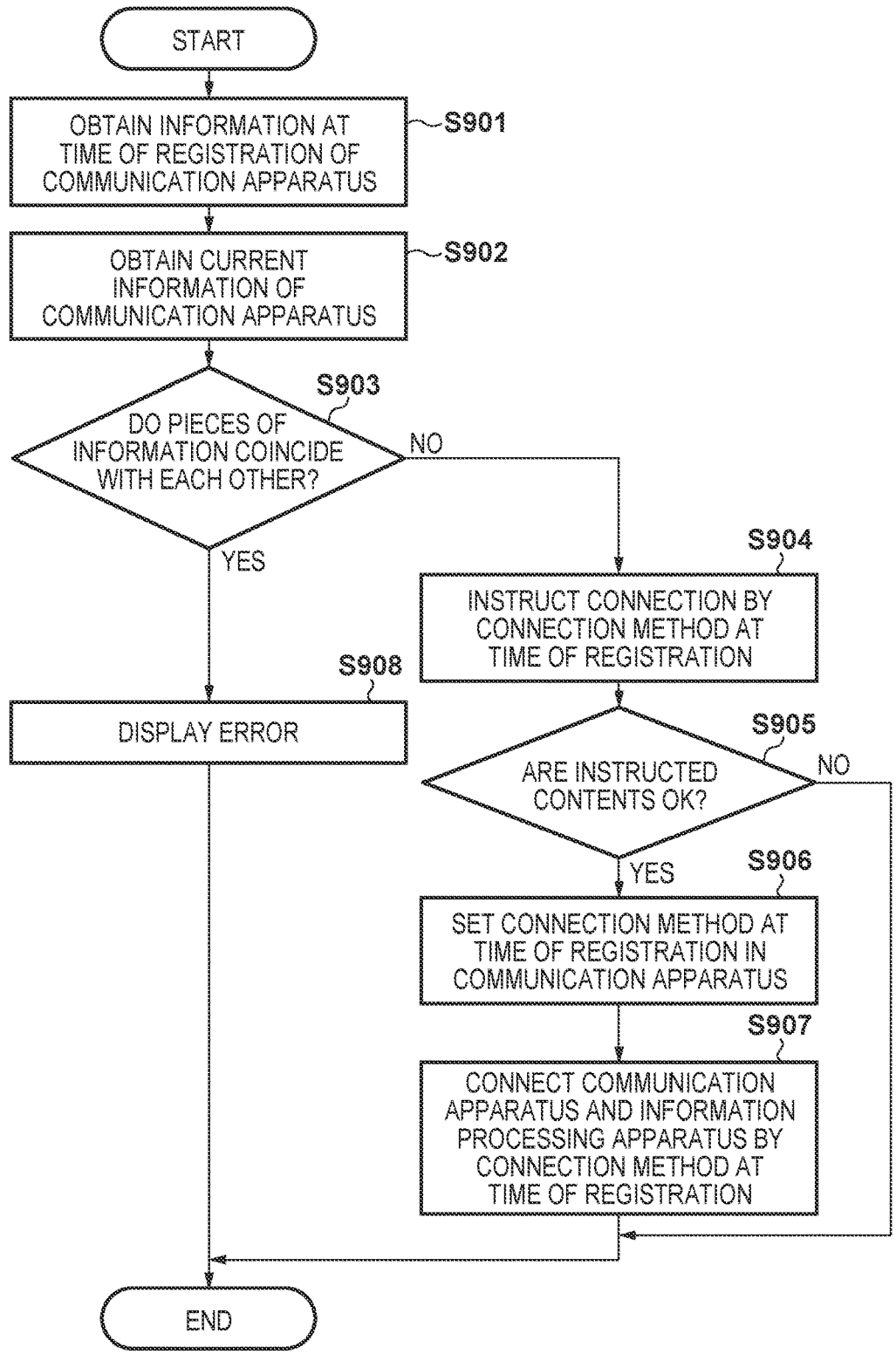
FIG. 9 is a flowchart illustrating an example of the processing of restoration processing.

FIG. 9 is a flowchart illustrating an example of the procedure of the restoration processing in step S703 according to this embodiment. The information processing apparatus 101 obtains the setting value of the network connection method from the information of the registered printer, and determines the network connection method set at the time of registration (step S901). That is, the information processing apparatus 101 saves the information about the registered printer in the external storage device 106 or the like. By reading out the information at the time of registration from the external storage device 106, the information processing apparatus 101 determines whether network connection has been performed by the infrastructure connection method or the direct mode. In addition, the information processing apparatus 101 confirms the SSID at the time of connection. Next, the information processing apparatus 101 re-obtains, by GATT communication by BLE, the information about the network connection method currently set in the printer (step S902). Note that if the printer is currently connected to the network by the infrastructure connection method, the information processing apparatus 101 also obtains information such as the SSID of the access point connected to the printer. After that, the information processing apparatus 101 determines whether the information (network setting) about connection among the pieces of information obtained in step S901 is identical to the network setting of the information obtained in step S902 (step S903). More specifically, the information processing apparatus 101 performs processing of determining whether the connection methods are identical or the SSIDs are identical. If it is determined that the pieces of information are identical (YES in step S903), the information processing apparatus 101 advances the process to step S908; otherwise (NO in step S903), the information processing apparatus 101 advances the process to step S904. When the information set at the time of registration is different from the information currently used for setting in the printer, the process advances to step S904. In this case, the information processing apparatus 101 displays a screen shown in FIG. 16.

Figure 16:
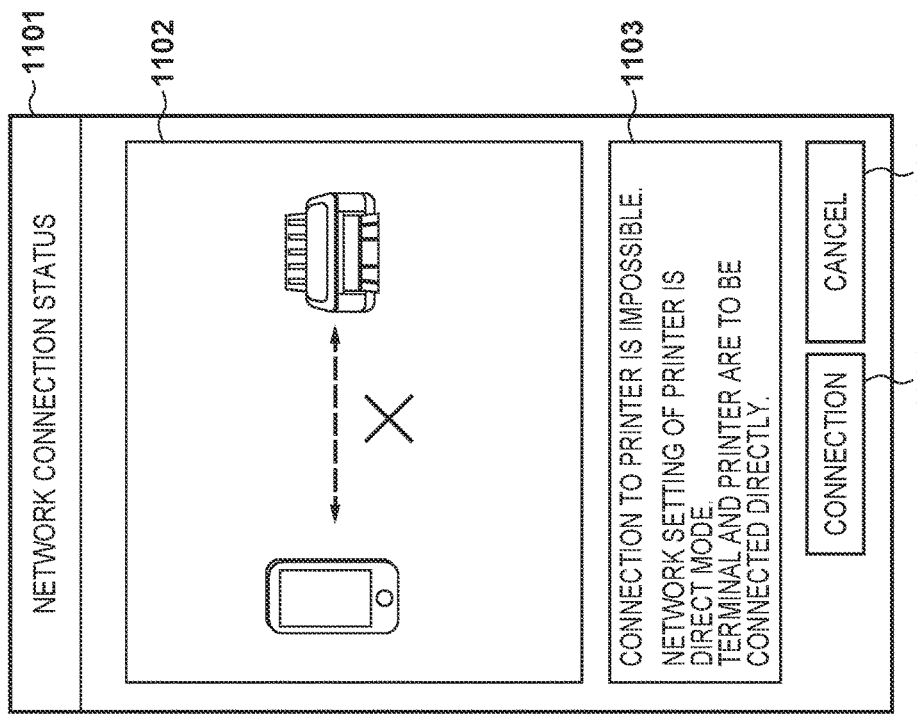
FIG. 16 is a view showing an example of a guide screen for connection setting including the connection form between the apparatuses.

FIG. 16 is a view showing an example of the screen displayed in step S904. The screen arrangement is almost the same as that shown in FIG. 13 except that there is no connection button 1301 on the screen of FIG. 16 and a restoration button 1601 is added. In FIG. 16, an image representing the network connection method of the printer at the time of registration, which has been obtained in step S901, is displayed in the image description region 1102. On the other hand, a message including information indicating that the network connection method has been changed and information indicating that the connection method of the printer is to be changed is displayed in the document description region 1103.

If the restoration button 1601 is pressed on the screen of FIG. 16 (YES in step S905), the information processing apparatus 101 performs GATT communication with the printer by BLE, and transmits a network connection method setting instruction to the printer (step S906). In step S906, the information processing apparatus 101 sets the network setting information such as the network connection method and SSID of the printer in the network setting information at the time of registration, which has been obtained in step S901 (step S906). The information processing apparatus 101 is connected to the printer by the network connection method at the time of printer registration, which has been obtained in step S901 (step S907).

Figure 17:
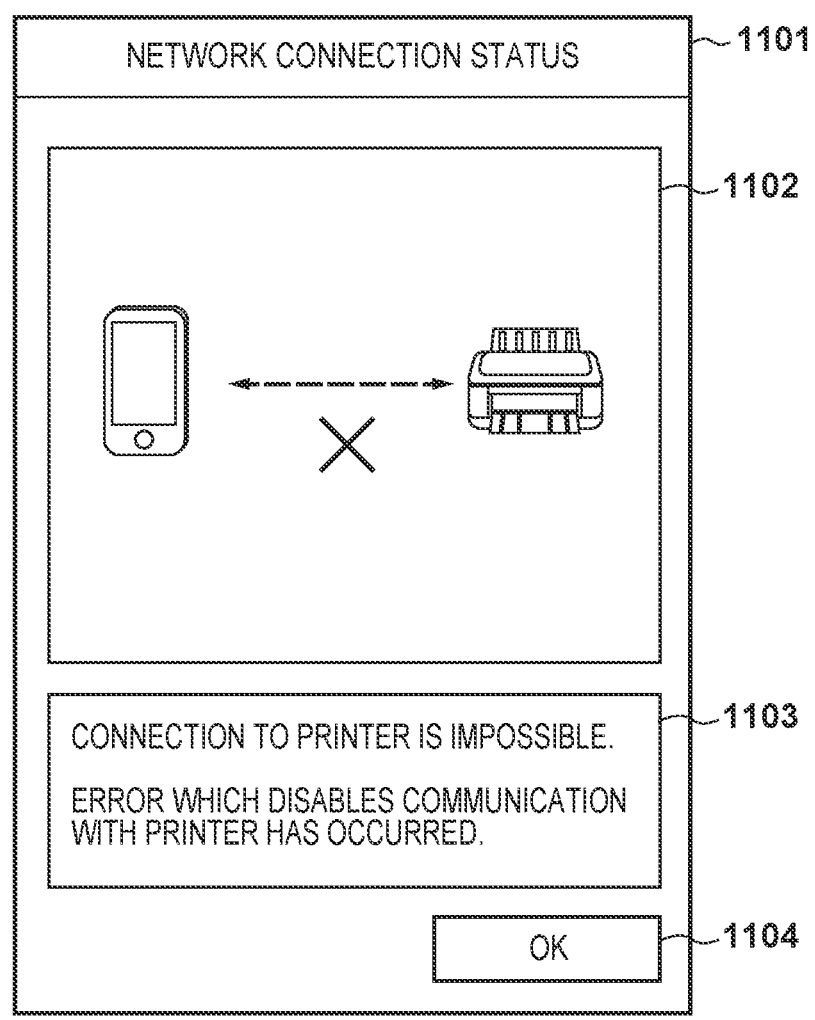
FIG. 17 is a view showing an example of an error screen.

A case in which the process advances to step S908 corresponds to a state in which the information processing apparatus 101 cannot communicate with the printer although the network setting information such as the network connection method remains unchanged in the registered target printer. This state can be determined, for example, when an error occurs in the printer, or while the printer communicates with another information processing apparatus. In this case, the information processing apparatus 101 can display an error, as shown in FIG. 17. A screen arrangement shown in FIG. 17 is the same as that shown in FIG. 11. In FIG. 17, an image indicating the network connection method of the printer at the time of registration, which has been obtained in step S901, is displayed in the image description region 1102. On the other hand, a message indicating that a status in which the information processing apparatus 101 cannot communicate with the printer has occurred is displayed in the document description region 1103. Note that if a status in which it is impossible to perform communication occurs in the printer, the information processing apparatus 101 may obtain information indicating the status when performing GATT communication with the printer by BLE in step S902.

Note that the network setting information at the time of registration is set in steps S904 to S907 of FIG. 9 in the above description. However, the processes in steps S904 to S907 may be executed using the network setting information obtained in step S902.

As described above, the information processing apparatus according to this embodiment obtains information of the network connection state in the communication apparatus as a communication partner, and displays, based on the obtained information, information indicating the connection form used between the information processing apparatus and the communication apparatus. Note that in an example, information is obtained by the short-range wireless communication method such as BLE, and the displayed connection form is related to the high-speed wireless communication method such as a wireless LAN (WLAN). This allows the user to recognize the connection form between the information processing apparatus and the communication apparatus. Thus, even if some problem arises, the user can readily deal with this.

Authentication can be performed between the information processing apparatus and the communication apparatus and pairing processing for executing read/write of data by GATT communication between the apparatuses can be executed. Note that GATT indicates a profile for managing read/write (transmission/reception) of information in the BLE standard. GATT communication indicates communication in which the information processing apparatus 101 serves as a GATT client, the communication apparatus 151 serves as a GATT server, and the information processing apparatus 101 reads/writes information from/in the communication apparatus 151 by the GATT-based profile. In a state in which no pairing is executed between the information processing apparatus 101 and the communication apparatus 151, the communication apparatus does not permit read/write of information by GATT communication. This can prevent the information processing apparatus which has not been paired from unnecessarily obtaining the information held in the communication apparatus. Note that PIN code authentication performed for the above authentication is an authentication method of permitting processing only when a predetermined character string held in one apparatus coincides with a character string input by the other apparatus, in order to limit transmission/reception of information to that by a specific user.

The pairing processing will be described in detail. The information processing apparatus 101 starts a search for advertising information containing specific apparatus information at a timing when, for example, the print application is activated and a home screen is displayed on the display unit 108. Note that the specific apparatus information contains, for example, the UUID, MAC address, and the like of the apparatus (the printer or the like) corresponding to the print application. Upon receiving the advertising information containing the specific apparatus information, the information processing apparatus 101 transmits a BLE connection request (CONNECT_REQ) to the apparatus (in this example, the communication apparatus 151) which has transmitted the advertising information, and establishes BLE connection between the apparatuses. If pairing with the communication apparatus 151 is not complete, the information processing apparatus 101 displays a screen shown in FIG. 22. If execution of pairing is instructed via the screen shown in FIG. 22, the information processing apparatus transmits a pairing request to the communication apparatus 151 by communication using a security manager protocol. Note that communication between the apparatuses is performed by the security manager protocol until pairing ends. The communication apparatus displays a PIN code display screen 1801 shown in FIG. 18A on the display unit of the communication apparatus. If a PIN code 1802 is displayed on the PIN code display screen 1801, and a Cancel button 1803 is selected, the pairing processing is canceled. On the other hand, the information processing apparatus displays, on the display unit, a PIN code input screen 1811 shown in FIG. 18B. The user inputs, to a PIN code input region 1812 of the PIN code input screen 1811, the PIN code ("11111" in the example shown in FIGS. 18A and 18B) displayed on the PIN code display screen 1801 of the communication apparatus, and selects an OK button 1813. This completes the pairing processing between the information processing apparatus and the communication apparatus. Even if a Cancel button 1814 is selected in the information processing apparatus, the pairing processing is canceled. Upon completion of pairing, the PIN code display screen 1801 is automatically set in a non-display mode, and the communication apparatus displays the original screen. If the PIN code is input and the OK button 1813 is pressed, the information processing apparatus transmits information containing the input PIN code to the communication apparatus.

The communication apparatus 151 determines whether the PIN code contained in the received information coincides with the PIN code 1802 displayed on the PIN code display screen 1801. If it is determined that the PIN codes coincide with each other, the communication apparatus 151 permits the information processing apparatus 101 to execute pairing. More specifically, the communication apparatus 151 creates a link key by a predetermined method based on the PIN code, and saves the created link key in the ROM 152. The communication apparatus 151 transmits the link key to the information processing apparatus 101 using SMP (Security Manager Protocol) of BLE. The information processing apparatus 101 saves, in the external storage device 106, the link key received from the communication apparatus 151. Note that in this embodiment, both the information processing apparatus 101 and the communication apparatus 151 save the same link key. However, the information processing apparatus 101 and the communication apparatus 151 may save different link keys as long as they are associated with each other. This completes pairing. After that, GATT communication by BLE between the information processing apparatus 101 and the communication apparatus 151 is permitted. After the completion of pairing, the information processing apparatus 101 notifies the communication apparatus of the saved link key when requesting GATT communication of the communication apparatus 151. Then, the communication apparatus can compare the saved link key with the notified link key, and confirm whether the apparatus has already been paired. If the communication apparatus can confirm that the information processing apparatus has already been paired, it starts GATT communication with the information processing apparatus. Note that the user input of the PIN code may be omitted by fixing the PIN code. In this example, pairing by the PIN code has been described. The present invention, however, is not limited to this. For example, pairing may be executed without using any PIN code. In this case, for example, data of GATT communication is encrypted. An encryption key can implement communication that can be decrypted by only the information processing apparatus of a user capable of confirming the display unit of the communication apparatus, by displaying or inputting the encryption key instead of the above-described PIN code.

Figure 19A:
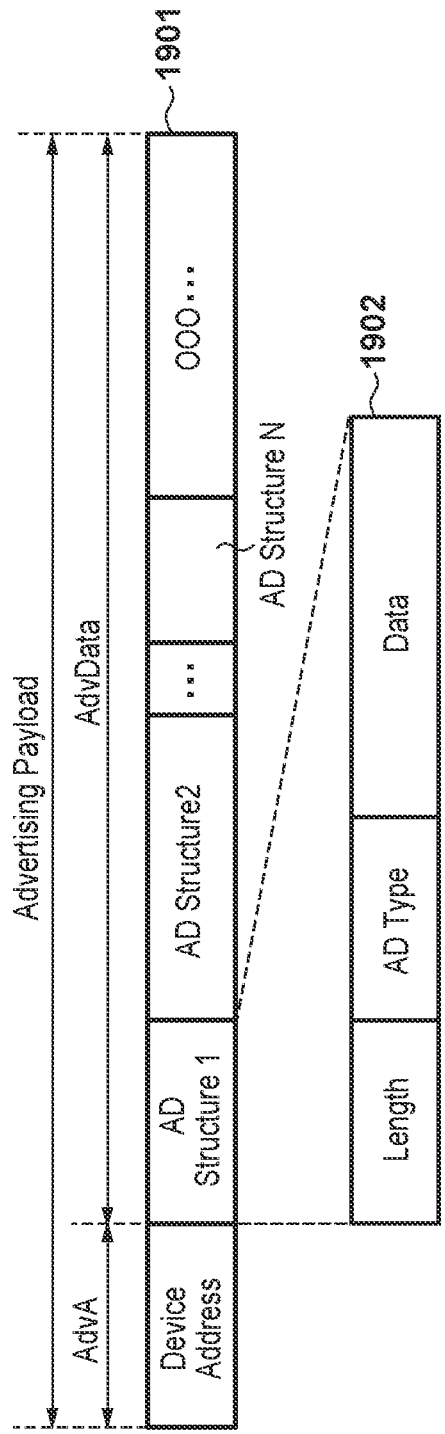

Contents of the advertising signal in BLE will be described. FIG. 19A is a view showing a payload portion contained in the advertising signal transmitted by the advertiser. An advertising payload 1901 is formed by including an advertising address (indicated by "AdvA" in FIG. 19A) and advertising data (indicated by "AdvData" in FIG. 19A).

In this embodiment, the advertising address is information uniquely assigned to the communication apparatus. On the other hand, the advertising data includes a plurality of advertising structure regions (each indicated by "AD Structure" in FIG. 19A). If the size of each advertising structure region is smaller than a predetermined capacity, padding with 0 is performed so that a data amount reaches the predetermined capacity. Each advertising structure region is formed by including the data length (indicated by "Length" in FIG. 19A) of the region, an advertising type (indicated by "AD Type" in FIG. 19A), and actual data (indicated by "Data" in FIG. 19A).

FIG. 19B shows an example of data 1911 stored in the advertising structure regions according to this embodiment. The advertising data in the advertising signal according to this embodiment includes three advertising structure regions (indicated by "AD Structure 1", "AD Structure 2", and "AD Structure 3" in FIG. 19B). In this example, AD Structure 1 has a general BLE data format and a description thereof will be omitted. Unique information of the communication apparatus 151 is stored in AD Structure 2. In this example, Length of AD Structure 2 indicates that the length of AD Type and Data of AD Structure 2 is 7 octets (1 octet indicates 8 bits). AD Type indicates the meanings of information in Data. In the example of FIG. 19B, a value of 0xFF is defined as the specific information of the communication apparatus 151. Data stores specific information and information of a function and state.

The specific information of the communication apparatus is information for making it possible to specify the manufacturer of the communication apparatus, or a home or office use when the use is specified. Data can also store the function and state of the communication apparatus. In FIG. 19B, a function and state 1912 of the communication apparatus is indicated by a byte array. In this embodiment, data indicating whether the communication apparatus has a print function is set in the first octet. If the communication apparatus has the print function, the value is set to 1; otherwise, the value is set to 0. Since the communication apparatus 151 according to this embodiment has the print engine 155, 1 is set in the first octet. If an error occurs in the communication apparatus 151, the communication apparatus 151 sets 1 in the second octet; otherwise, the communication apparatus 151 sets 0 in the second octet. For example, if ink in the communication apparatus runs out during printing, ink needs to be replaced, and the communication apparatus is in a print disable state at this time, and is in a print standby state until at least the ink is replaced. Therefore, if it is detected in the print engine 155 that the ink runs out, 1 is set in the second octet. A page number is stored in the 16th octet. In the example of FIG. 19B, 0 is set in the 16th octet. If, however, 1 is set in the 16th octet, pieces of information in other octets are different. For example, the first octet indicates the presence/absence of the print function for a page number of 0 but the first octet can store other information for a page number of 1. Even if the size which can be stored in the advertising information is limited, other information can be transmitted by changing the page number.

Note that the contents and structure of the date stored in the advertising structure region are not limited to the above described ones. For example, a UUID (Universally Unique Identifier) as a number with which a combination of the device and state information of the communication apparatus and the manufacturer is uniquely identifiable is predefined. Then, the communication apparatus 151 may select a corresponding UUID in accordance with the state of itself or the like, store the selected UUID in the advertising structure region, and execute advertising. In this example, by defining a plurality of UUIDs in accordance with combinations, it is possible to avoid a match (collision phenomenon) with the UUID in the advertising information transmitted by another communication apparatus. If the collision phenomenon occurs, an operation error may occur when the information processing apparatus 101 processes the advertising of the other communication apparatus. The name of the communication apparatus is stored in AD Structure 3. The name of the communication apparatus is different for each apparatus, and AD Structure 3 is thus variable. Length of AD Structure 3 indicates that the length of AD Type and Data of AD Structure 3 is 9 octets. AD Type of AD Structure 3 indicates the meaning of information in Data. In the example of FIG. 19B, a value of 0x09 is defined as the name of the communication apparatus 151. Data indicates the name of the communication apparatus. In the example of FIG. 19B, the name of the communication apparatus is "Printer A".

The advertising signal by the communication apparatus can be transmitted steadily, as shown in FIG. 3. The data of the advertising signal can be changed in accordance with the state of the communication apparatus, as described above. Note that the advertising signal is transmitted steadily in this embodiment. The present invention, however, is not limited to this. For example, the advertising signal may be transmitted only if a specific condition is satisfied, for example, when a user operation is performed via the input interface 158 of the communication apparatus 151.

A timing at which the pairing processing is executed will be described below. In this embodiment, when transiting to the specific screen of the print application in a status in which no pairing processing is executed, the pairing processing can be executed. The pairing processing may be executed at a timing when the specific button of the print application is pressed. For example, the pairing processing is executed at a timing when the screen transits to FIG. 20D upon the pressing of the image print button 2012 (to be described later) or at a timing when the screen transits upon the pressing of the document print button 2013. Alternatively, the pairing processing may be performed at a timing when the network diagnostics button 404 is pressed. The screen of the application will now be described. The information processing apparatus 101 accepts, via the input interface 102, from the user, an instruction to activate the application for providing the print execution function, which is stored in the external storage device 106. In response to acceptance of the instruction, the information processing apparatus 101 activates the print application. Note that the communication apparatus 151 will be referred to as a printer hereinafter.

Figure 20A:
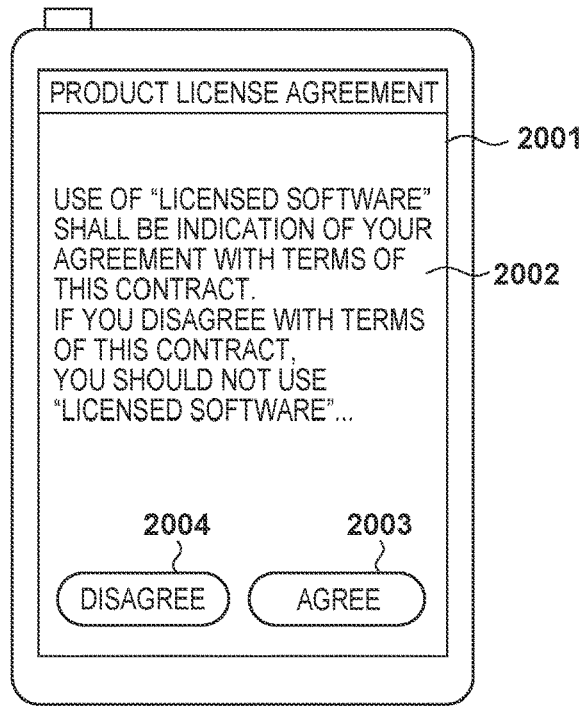
FIGS. 20A to 20F are views showing screen transition of a print application.
Figure 20B:
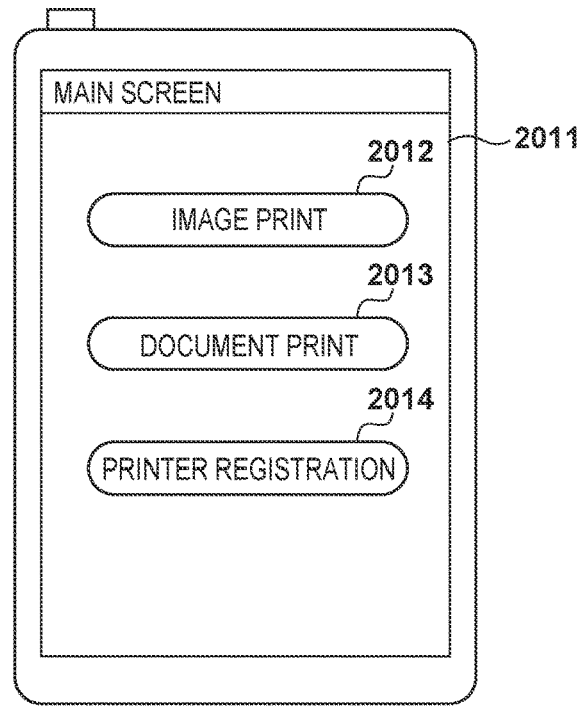
Figure 20C:
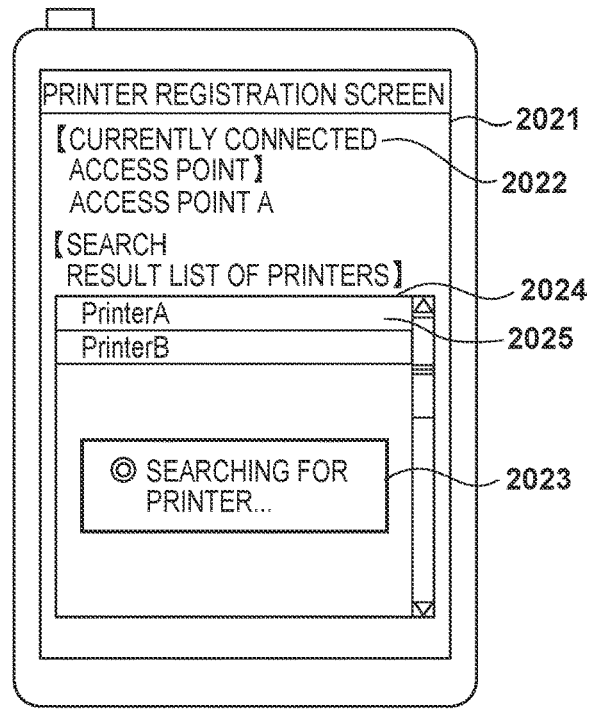
Figure 20D:
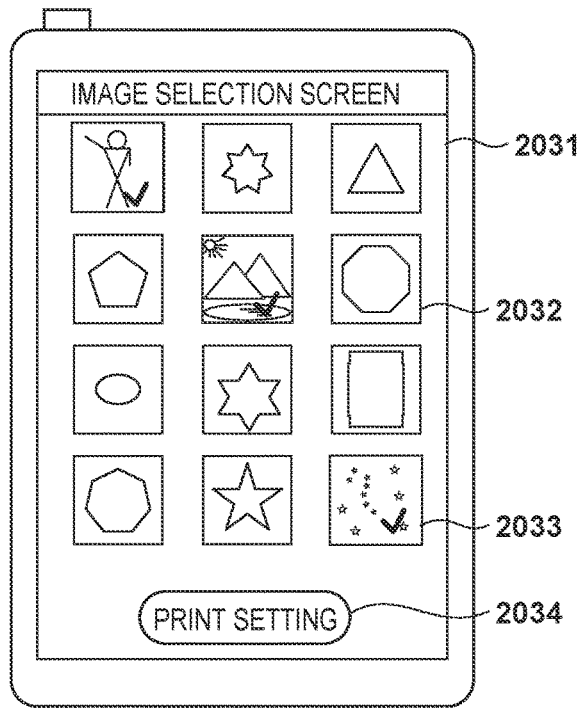
Figure 20E:
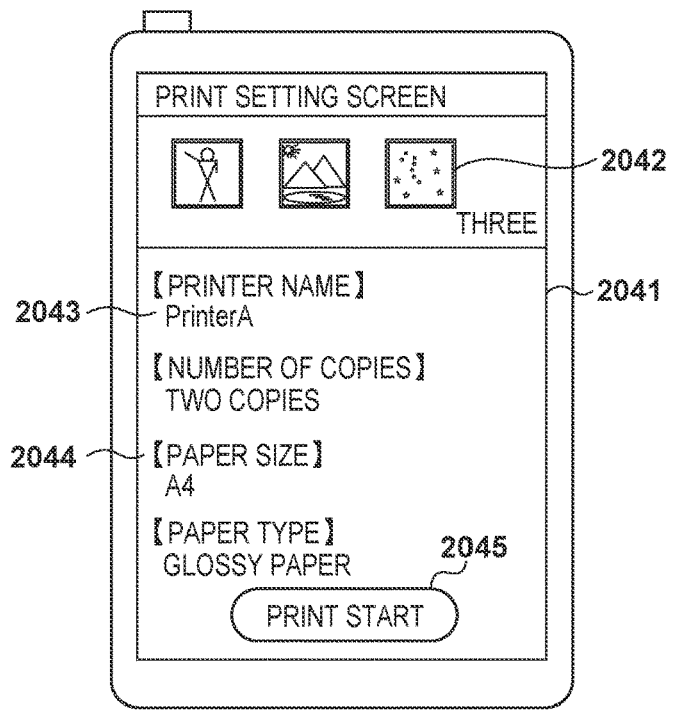
Figure 20F:
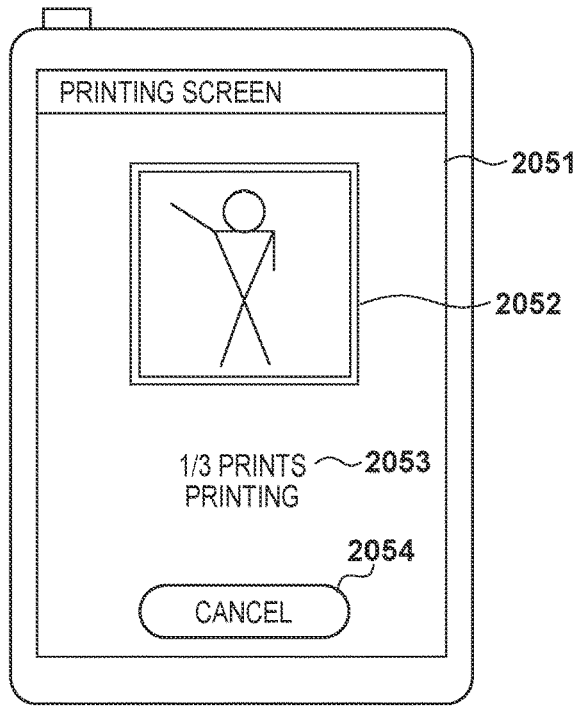

FIGS. 20A to 20F show screen transition of the print application, which is displayed to the user via the display unit 108 by the print application. Referring to FIG. 20A, a product license agreement screen 2001 is a screen for prompting the user to confirm, for example, a condition to fulfill when using the print application. The user confirms product license agreement sentences 2002 and selects whether to agree. If the user disagrees, he/she selects a button 2004 to exit the print application. If the user agrees, he/she selects a button 2003 to cause the screen display to transit to a main screen 2011 shown in FIG. 20B.

The main screen 2011 shown in FIG. 20B displays a list of main functions of the print application. If, for example, a print target stored in the external storage device 106 of the information processing apparatus 101 or the like is image data, the user selects the image print button 2012 to cause the screen display to transit to an image selection screen 2031. On the other hand, if the print target is document data, the user selects the document print button 2013 to cause the screen display to transit to a document selection screen (not shown). To specify a printer in the wireless communication network, information for specifying the printer, function information, and the like can be registered in the print application. Note that the information (to be referred to as "specific information" hereinafter) for specifying the printer can be at least one of the identification information (MAC address), the IP address, and the name of the printer. The function information of the printer can be information regarding the performance or the like of the printer, such as a printable paper type list. When the print application registers the specific information and function information, these pieces of information are saved in the external storage device 106 in association with each other. A printer for which such registration processing has been executed will be referred to as a registered printer hereinafter, and a printer which executes print processing will be referred to as a current printer hereinafter. Note that a plurality of printers may be registered, although a description thereof will be omitted in this embodiment. In this case, the user selects the current printer from the registered printers before executing the print processing. Note that if there is only one registered printer, that printer serves as the current printer.

When registering the printer, the user selects the printer registration button 2014. When the printer registration button 2014 is selected, the screen of FIG. 5 described above is displayed. When the printer search button 502 in FIG. 5 is pressed, the screen display transits to FIG. 20C. After transiting to a printer registration screen 2021, the print application automatically executes processing of searching for a printer connected to the wireless communication network, and displays the found printer in a list form (FIG. 6). In this example, the found printer is displayed with the name of the printer contained in the specific information. The user selects a printer to register from a printer group listed on the printer registration screen 2021, thereby determining the registered printer. Note that the user can select a plurality of printers to register.

The printer registration screen 2021 shown in FIG. 20C will be continuously described. On the printer registration screen 2021, the SSID of the access point 131 currently connected to the information processing apparatus 101 is displayed as an access point name 2022. As an example, an SSID "access point A" is displayed. A modal dialog 2023 is a dialog for explicitly indicating currently executed processing. During display of the modal dialog 2023, another region is blacked out and cannot be operated. After the end of the search, the modal dialog 2023 is set in a non-display state, the other region is brightened, and thus it is possible to accept a user operation such as selection of another button. The result of the printer search is displayed in a search result list 2024. In the example of FIG. 20C, two found printers (Printer A and Printer B) are displayed. That is, "Printer A" and "Printer B" are currently connected to access point A. When accepting the selection from the listed printers shown in FIG. 6 in accordance with a user instruction, the information processing apparatus 101 registers the selected printer as the registered printer and returns to the main screen 2011 (or FIG. 4). Note that in this embodiment, there is only one registered printer, and thus the selected printer serves as the current printer.

A case in which the image print button 2012 is selected on the main screen 2011 will be described next. When the image print button 2012 is selected, the display screen transits to the image selection screen 2031. The thumbnail images of the image data stored in the external storage device 106 of the information processing apparatus 101 are displayed on the image selection screen 2031, and the user selects print target images by selecting thumbnail images 2032. For the selected images, check marks 2033 indicating the print targets are displayed on the thumbnails. If the user selects a print setting button 2034 in a state in which the images are selected, the display screen transits to a print setting screen 2041.

The thumbnails of the print target images are displayed in a thumbnail display region 2042 of the print setting screen 2041. The print target images are the images with the check marks on the image selection screen 2031. The printer name of the current printer is displayed in a printer name display region 2043. A name which is contained in the specific information of the communication apparatus stored in association with the current printer is displayed as the printer name. Note that if there are a plurality of registered printers, the name of the registered printer selected by the user via a printer selection screen (not shown) or the like is displayed as the current printer. Print conditions when executing printing are displayed in a print condition display region 2044. The user can appropriately change the print conditions on a print condition change screen (not shown). When the user selects a print start button 2045 for instructing the print application to start printing, the display screen transits to a printing screen 2051.

On the printing screen 2051, the print application transmits, to the current printer (in this embodiment, Printer A), an instruction (print job) to perform print processing for each print target image selected by the user under the print conditions displayed in the print condition display region. The currently printed image among the print target images is displayed as a printing image 2052 on the printing screen 2051. The progress and status of printing are displayed as a message 2053. If some problem arises during printing, and printing cannot be continued or is stopped, this state is displayed as the message 2053 to notify the user of the state. If the user selects a cancel button 2054, printing is stopped, and the display screen returns to the previously displayed print setting screen 2041.

FIG. 21 is a flowchart illustrating the procedure of the pairing processing executed by the print application in the information processing apparatus. The information processing apparatus executes this processing in response to the activation of the print application. As another timing, at a timing when a predetermined button is pressed in the print application, the processing shown in FIG. 21 may start. That is, the information processing apparatus may start the processing shown in FIG. 21 at a timing when the predetermined button (the print button 402 or the network diagnostics button 404) is pressed in the print application. First, the information processing apparatus receives (searches for) an advertising signal originated from the printer (communication apparatus), and the print application receives a notification of the reception of the advertising signal from the communication circuit of the information processing apparatus (step S2101). At this time, information stored in the advertising signal (the advertising payload 1901) is also transferred to the print application. Upon receiving the advertising signal, the print application confirms whether it is possible to execute pairing with the printer (step S2102). If it is determined that it is impossible to execute pairing with the printer (NO in step S2102), the print application ends the process.

This confirmation processing will be described with reference to the screens of the print application shown in FIGS. 20A to 20F. During display of each of the screens shown in FIGS. 20A to 20F, a state in which the print application prompts the user to perform confirmation or a state in which some processing is in progress can be set. In this case, no pairing is executed. For example, while the product license agreement screen 2001 is displayed, the use of the print application is not permitted unless the user agrees to the product license agreement. Thus, even if the advertising signal is received, no pairing processing is executed. In this embodiment, if the pairing processing is executed during execution of the printer search processing or during display of the modal dialog 2023 in the printer search, as shown in FIG. 20C, for example, a plurality of dialogs are displayed and thus the user operation becomes complicated. To avoid this, no pairing processing is executed during display of the modal dialog 2023. On the other hand, if the printer search ends, and the modal dialog 2023 is set in the non-display state, it can be determined that the pairing processing is executable.

If it is determined that pairing is executable (YES in step S2102), the print application analyzes the received advertising information (step S2103). In this example, the data 1911 stored in the above-described advertising structure regions is analyzed. After the end of the analysis, the print application determines whether specific advertising processable by itself has been received (step S2104). In this embodiment, the above-described specific information of the communication apparatus (printer) is used for this determination processing. In an example, this specific information contains information for specifying the communication apparatus, such as a manufacturer or a home or office use. When the print application is an application supporting a home printer, if the specific information stores information indicating an office use, the print application determines not to execute the pairing processing. On the other hand, if the specific information stores information indicating a home printer, the print application determines to execute pairing. Note that the determination processing is performed based on the specific information in this example. The present invention, however, is not limited to this. For example, for a printer having, as the communication apparatus name of the advertising information, a specific name supported by the print application, it may be determined to execute pairing. Whether to execute pairing may be determined based on the function and state 1912 of the communication apparatus. For example, if the communication apparatus has no print function, the print application executes no pairing with the communication apparatus. If the printer is in an error state and a status application for processing the error information of the printer is installed on the information processing apparatus, the print application may guide the user to the status application without executing pairing. Then, the status of the printer is displayed in the status application.

If it is determined that the received advertising information is not specific advertising information processable by the print application (NO in step S2104), the print application ends the processing of this flowchart without executing the pairing processing. On the other hand, if it is determined that the received advertising information is specific advertising information processable by the print application (YES in step S2104), the print application obtains a list of communication apparatuses with which the information processing apparatus 101 has been paired (step S2105).

After obtaining the list of communication apparatuses with which the information processing apparatus 101 has been paired, the print application confirms whether the information processing apparatus 101 and the communication apparatus 151 have already been paired (step S2106). More specifically, step S705 is implemented by determining whether the list obtained in step S2105 includes the information of the communication apparatus as the analysis result in step S2103. If the information processing apparatus 101 and the communication apparatus 151 have already been paired (YES in step S2106), the print application ends the process. By skipping the succeeding processes when the information processing apparatus 101 and the communication apparatus 151 have already been paired, as described above, it is possible to prevent unnecessary display and confirmation of a confirmation dialog 2201 (to be described later). On the other hand, if pairing between the information processing apparatus 101 and the communication apparatus 151 is not complete (NO in step S2106), the print application confirms whether the printer which originates advertising is the above-described registered printer (step S2107).

If the printer which originates advertising is the registered printer (YES in step S2107), the print application executes the pairing processing without performing pairing execution confirmation (to be described later) (step S2109). Since the registered printer is a printer to which connection is established by the information processing apparatus and which is determined by the user to use in the print application, it is unnecessary to perform pairing execution confirmation. Thus, unnecessary pairing execution confirmation is not performed, thereby reducing the user's labor. If the printer which originates advertising is not the registered printer (NO in step S2107), the print application confirms with the user whether to execute pairing (step S2108). Since the terminal apparatuses of a number of unspecified users may receive the advertising of BLE due to its characteristics, pairing execution confirmation may be performed to confirm whether the printer is a printer owned by the user.

FIG. 22 shows an example of the confirmation dialog 2201 displayed in step S2108. A printer name 2202 is displayed on the confirmation dialog 2201, and confirmation of whether the printer is a printer desired by the user is accepted. If the user selects a "YES" button 2203 (YES in step S2108), the print application executes the pairing processing (step S2109). On the other hand, if the user selects a "NO" button 2204 (NO in step S2108), the print application ends the process without executing pairing. Note that the status (low ink level, error, or the like) of the printer may be displayed on the screen shown in FIG. 22.

Figure 18A:
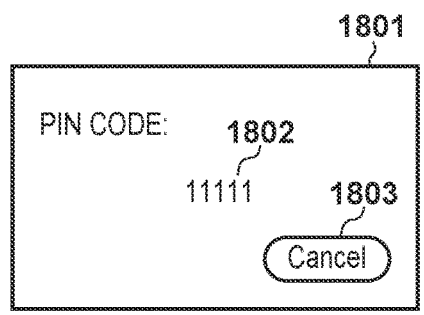
FIGS. 18A and 18B are views each showing a screen display example at the time of PIN code authentication.
Figure 18B:
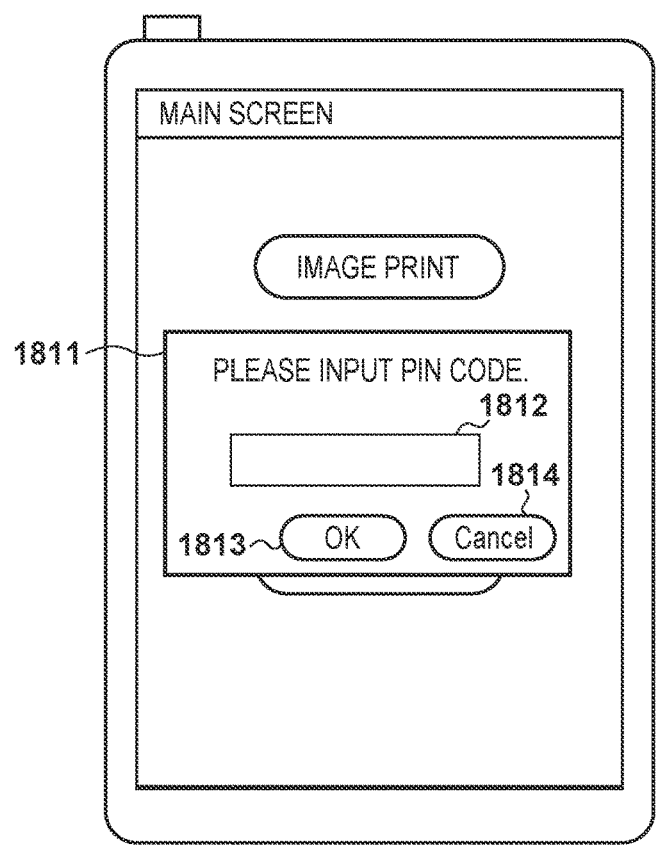

The pairing processing executed in step S2109 has been described with reference to FIGS. 18A and 18B and a description thereof will be omitted.

According to the present invention, it is possible to present appropriate information to the user when performing connection or restarting disconnected connection.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-073180, filed Mar. 31, 2016, which is hereby incorporated by reference herein in its entirety.

What is claimed is:

1. An information processing apparatus, comprising:
at least one memory storing instructions; and
at least one processor executing the instructions stored in the memory;
wherein the instructions are executed to:
perform communication with a communication apparatus by a first communication method;
perform communication with the communication apparatus by a second communication method different from the first communication method;
obtain, from the communication apparatus, first information relating to a network connection in the communication apparatus using the first communication method; and
hold the obtained first information in the at least one memory, wherein
in a case where the information processing apparatus cannot communicate with the communication apparatus by the first communication method using the first information that is held in the at least one memory, obtain, from the communication apparatus and via communication using the second communication method, second information relating to the network connection in the communication apparatus using the first communication method; and
in a case where the obtained second information is different from the first information that is held in the at least one memory, transmit, to the communication apparatus and via communication using the second communication method, the first information.

2. The information processing apparatus according to claim 1, wherein
the instructions are further executed to,
if the second information is different from the first information that is held in the at least one memory, display to accept a restoration instruction, and the at least one processor is configured to transmit, if the restoration instruction is accepted, the second information via communication using the second communication method.

3. The information processing apparatus according to claim 1, wherein if the obtained second information coincides with the first information that is held in the at least one memory, an error is displayed.

4. The information processing apparatus according to claim 1, wherein
the first communication method is a communication method related to a wireless LAN, and
the second communication method is a communication method related to Bluetooth Low Energy.

5. The information processing apparatus according to claim 1, wherein the first communication method is a communication method related to a wireless LAN and the second communication method is a communication method related to a WiFi Aware.

6. The information processing apparatus according to claim 1, wherein in a case where the information processing apparatus cannot communicate with the communication apparatus, information indicating that the information processing apparatus cannot communicate with the communication apparatus is displayed.

7. The information processing apparatus according to claim 1, wherein the first information is obtained by search processing using an access point connected to the information processing apparatus.

8. The information processing apparatus according to claim 1, wherein print data is transmitted via communication using the first communication method to the communication apparatus.

9. A control method for an information processing apparatus performs communication with a communication apparatus by a first communication method and performs communication with the communication apparatus by a second communication method different from the first communication method, the method comprising:
obtaining, from the communication apparatus, first information relating to a network connection in the communication apparatus using the first communication method;
holding the obtained first information in a memory;
in a case where the information processing apparatus cannot communicate with the communication apparatus by the first communication method using the first information that is held in the memory, obtaining, from the communication apparatus and via communication using the second communication method, second information relating to the network connection in the communication apparatus using the first communication method; and
in a case where the obtained second information is different from the first information that is held in the memory, transmitting, to the communication apparatus and via communication using the second communication method, the first information.

10. The method according to claim 9, wherein
if the second information is different from the first information that is held in the memory, display to accept a restoration instruction, and
the method further comprises transmitting, if the restoration instruction is accepted, the second information via communication using the second communication method.

11. The method according to claim 9, wherein if the obtained second information coincides with the first information that is held in the memory, an error is displayed.

12. The method according to claim 9, wherein
the first communication method is a communication method related to a wireless LAN, and
the second communication method is a communication method related to Bluetooth Low Energy.

13. The method according to claim 9, wherein the first communication method is a communication method related to a wireless LAN and the second communication method is a communication method related to WiFi Aware.

14. The method according to claim 9, wherein in a case where the information processing apparatus cannot communicate with the communication apparatus, information indicating that the information processing apparatus cannot communicate with the communication apparatus is displayed.

15. The method according to claim 9, wherein the first information is obtained by search processing using an access point connected to the information processing apparatus.

16. The method according to claim 9, wherein print data is transmitted via communication using the first communication method to the communication apparatus.

17. A non-transitory computer-readable storage medium storing a computer program for causing a computer, included in an information processing apparatus that performs communication with a communication apparatus by a first communication method and performs communication with the communication apparatus by a second communication method different from the first communication method, to:
obtain, from the communication apparatus, first information relating to a network connection in the communication apparatus using the first communication method;
hold the obtained first information in a memory;
in a case where the information processing apparatus cannot communicate with the communication apparatus by the first communication method using the first information that is held in the memory, obtain, from the communication apparatus and via communication using the second communication method, second information relating to network connection in the communication apparatus using the first communication method; and
in a case where the obtained second information is different from the first information that is held in the memory, transmit, to the communication apparatus and via communication using the second communication method, the first information.

* * * * *